United States Patent
Sirenko et al.

(10) Patent No.: US 12,509,652 B2
(45) Date of Patent: Dec. 30, 2025

(54) METHOD AND SYSTEM FOR CULTIVATING CELLS IN MEDIA-EXCHANGING WELLS

(71) Applicants: MOLECULAR DEVICES, LLC, San Jose, CA (US); Molecular Devices (Austria) GmbH, Puch Hallein (AT)

(72) Inventors: Oksana Sirenko, San Jose, CA (US); Andreas Kenda, Puch/hallein (AT); Josef Atzler, Puch/hallein (AT)

(73) Assignees: Molecular Devices, LLC, San Jose, CA (US); Molecular Devices (Austria) GmbH (AT)

( * ) Notice: Subject to any disclaimer, the term of this patent is extended or adjusted under 35 U.S.C. 154(b) by 924 days.

(21) Appl. No.: 17/631,917

(22) PCT Filed: Jul. 31, 2020

(86) PCT No.: PCT/US2020/044545
§ 371 (c)(1),
(2) Date: Feb. 1, 2022

(87) PCT Pub. No.: WO2021/026010
PCT Pub. Date: Feb. 11, 2021

(65) Prior Publication Data
US 2022/0282192 A1 Sep. 8, 2022

Related U.S. Application Data

(60) Provisional application No. 62/882,363, filed on Aug. 2, 2019.

(51) Int. Cl.
*C12M 3/00* (2006.01)
*C12M 1/00* (2006.01)
*C12M 1/32* (2006.01)
*C12N 5/00* (2006.01)

(52) U.S. Cl.
CPC ............ *C12M 21/08* (2013.01); *C12M 23/12* (2013.01); *C12M 23/22* (2013.01); *C12M 23/38* (2013.01); *C12M 23/44* (2013.01); *C12M 23/48* (2013.01); *C12M 23/58* (2013.01); *C12N 5/0062* (2013.01)

(58) Field of Classification Search
CPC ...... C12M 21/08; C12M 23/12; C12M 23/22; C12M 23/38; C12M 23/44; C12M 23/48; C12M 23/58; C12N 5/0062
See application file for complete search history.

(56) References Cited

U.S. PATENT DOCUMENTS

| | | |
|---|---|---|
| 9,573,128 B1 | 2/2017 | McClelland |
| 2009/0047180 A1 | 2/2009 | Kawahara |
| 2014/0322806 A1 | 10/2014 | Bennett et al. |
| 2017/0267961 A1 | 9/2017 | Hung et al. |
| 2018/0059131 A1 | 3/2018 | McClelland et al. |
| 2018/0187136 A1 | 7/2018 | Lichtenberg et al. |

FOREIGN PATENT DOCUMENTS

| | | |
|---|---|---|
| GB | 2147100 | 5/1985 |
| WO | 2015/178413 A1 | 11/2015 |
| WO | 2018/181763 A1 | 10/2018 |
| WO | 2019/008189 A1 | 1/2019 |
| WO | 2019/014541 | 1/2019 |

OTHER PUBLICATIONS

Ng, W. PeerJ PrePrints (2017) (Year: 2017).*
Smyrek, I., et al. Biomedical optics express 8.2 (2017): 484-499 (Year: 2017).*
Wong, SF, et al. Biomaterials 32.32 (2011): 8087-8096 (Year: 2011).*
Ohaus. (2017). Instruction Manual Digital Incubating Shaker. https://deon0hlc66wzg.cloudfront.net/images/ohaus_incubating_shaker_light_duty_manual.pdf?v=3947485037 (Year: 2017).*
Lee, Kangsun, et al. Biomicrofluidics 6.1 (2012). (Year: 2012).*
International Search Report and Written Opinion of the International Searching Authority for International Patent Application No. PCT/US2020/044545 mailed Nov. 30, 2020, 10 pages.
European Extended Search Report in Application 20850643.6, mailed Jul. 21, 2023, 8 pages.
PCT International Preliminary Report on Patentability in International Patent Application No. PCT/US2020/044545 mailed Feb. 17, 2022, 7 pages.

\* cited by examiner

*Primary Examiner* — Anoop K Singh
*Assistant Examiner* — Zanna Maria Beharry
(74) *Attorney, Agent, or Firm* — Merchant & Gould P.C.

(57) ABSTRACT

Methods, systems, and apparatus for cultivating cells in media-exchanging wells. In an exemplary method of cell cultivation, a device (50) may be selected that includes a row of wells (52), and a first reservoir (56) and a second reservoir (58) located at opposite ends of the row of wells (52). Each well (52) may have a lower portion and an upper portion. The lower portion of each well (52) of at least two of the wells (52) may contain a cell culture in contact with a liquid. Liquid may be transferred between the first reservoir (56) and the second reservoir (58) at least partly along a flow path (62) defined by the device and extending through the upper portion of each well (52) of the row of wells (52), such that molecules of the media are exchanged between or among the at least two wells (52).

20 Claims, 13 Drawing Sheets

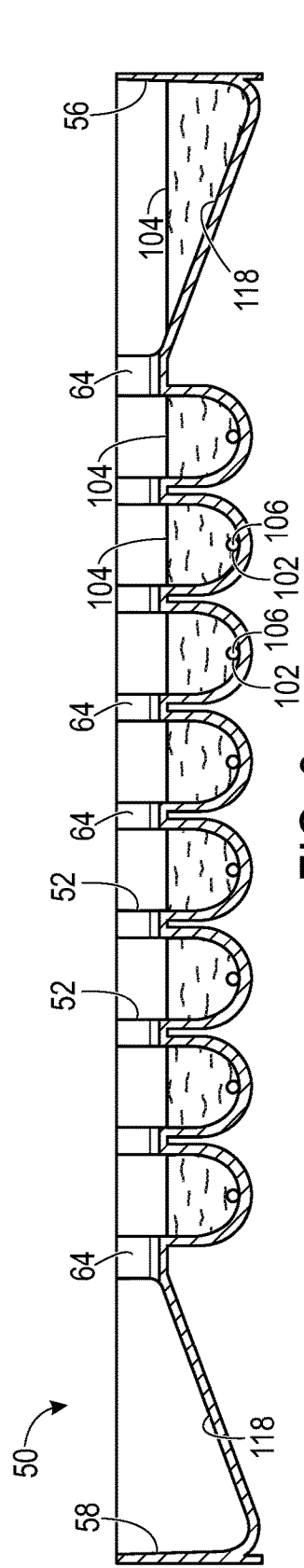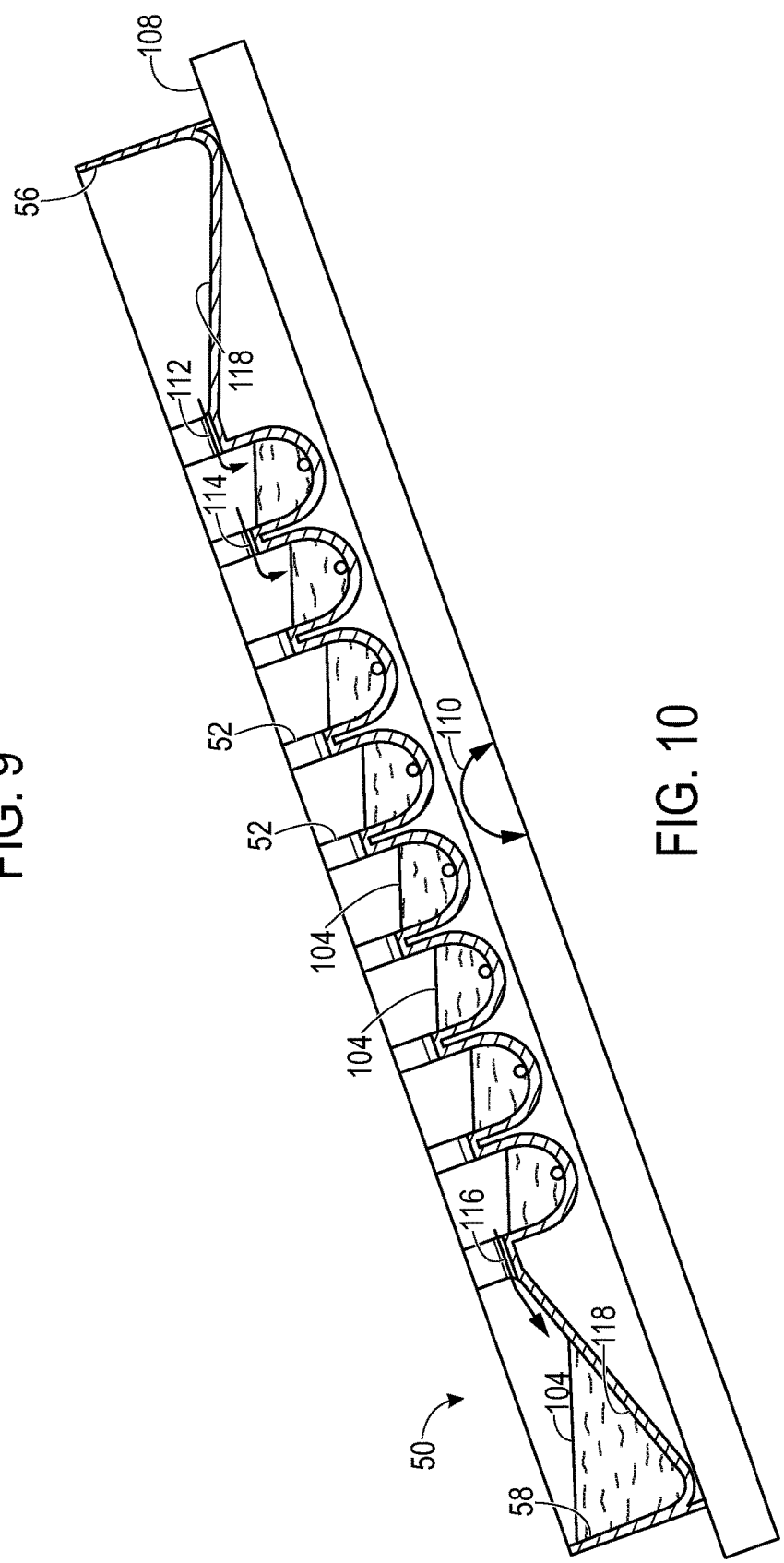

METHOD AND SYSTEM FOR CULTIVATING CELLS IN MEDIA-EXCHANGING WELLS

RELATED APPLICATION

This application is a National Stage Application of PCT/US2020/044545 filed on Jul. 31, 2020, which claims priority to U.S. provisional application No. 62/882,363 filed on Aug. 2, 2019, the contents of which are incorporated herein by reference in their entireties. To the extent appropriate, a claim of priority is made to each of the above disclosed applications.

INTRODUCTION

There is a pressing need to increase the biological relevance of cell-based assays. To meet this need, researchers have turned with growing interest to organoids. An organoid is a three-dimensional cluster of cells of different types produced in vitro and having some resemblance to an organ, such as exhibiting a realistic histology of organ-specific tissue. The cluster of cells may be generated by seeding a matrix, such as a hydrogel, with a small number of stem cells. The stem cells then proliferate, differentiate, and self-organize within the matrix, while using the matrix as a scaffold.

Organoids resembling tissue from the brain, heart, intestine, kidney, liver, and stomach, among others, have been generated in "organ-on-a-chip" systems. In some cases, a plurality of different types of organoids, such as organoids representing brain, heart, and liver, are cultured in the same device under conditions of media exchange. This creates a "body-on-a-chip" system in which a set of organoids representing an organ system can interact one another at a distance via signaling molecules. Both organ-on-a-chip and body-on-a chip systems have produced promising results, thereby driving a fundamental shift from animal tests to three-dimensional (3D) cell-based models for studying biological processes, modeling disease, and testing drugs. These 3D cell-based models are attractive to researchers because they can reduce the hands-on time and cost for experiments. However, currently available technologies for organoid culture are typically very complex, not highly reproducible, often incompatible with automation, and not well characterized.

New methods, systems, and apparatus are needed for cultivating separate cell cultures under conditions of media exchange to permit interaction between the cultures.

SUMMARY

The present disclosure provides methods, systems, and apparatus for cultivating cells in media-exchanging wells. In an exemplary method of cell cultivation, a device may be selected that includes a row of wells, and a first reservoir and a second reservoir located at opposite ends of the row of wells. Each well may have a lower portion and an upper portion. The lower portion of each well of at least two of the wells may contain a cell culture in contact with a medium. Liquid may be transferred between the first reservoir and the second reservoir at least partly along a flow path defined by the device and extending through the upper portion of each well of the row of wells, such that molecules of the media are exchanged between or among the at least two wells.

BRIEF DESCRIPTION OF THE DRAWINGS

FIG. 9 is a sectional view of the culture vessel of FIG. 2, taken as in FIG. 5, with the culture vessel oriented horizontally, each well and a first reservoir of the device holding a separate volume of media, and each well containing a separate 3D cell culture.

FIG. 10 is another sectional view of the culture vessel of FIG. 2, taken as in FIG. 9, except with the culture vessel supported at an incline by a rocking platform after net flow of liquid through the row of wells from the first reservoir to a second reservoir of the culture vessel.

DETAILED DESCRIPTION

Figure 1:
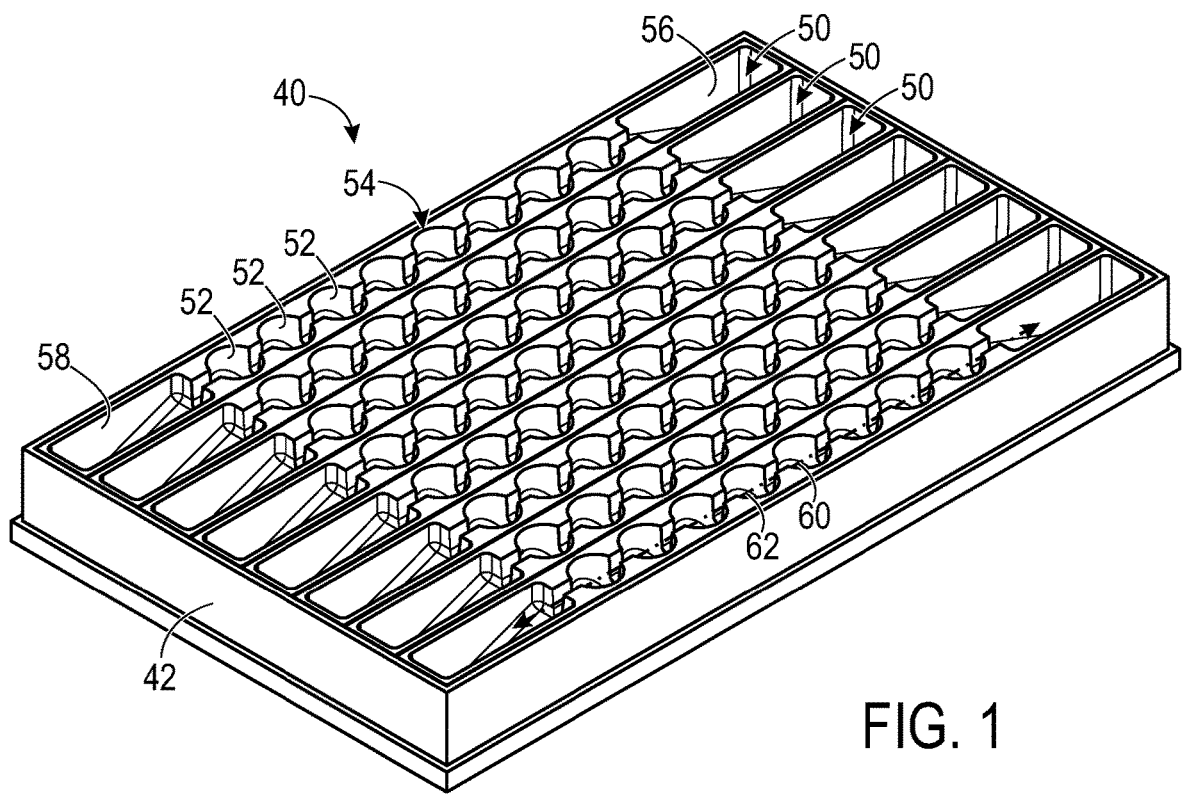
FIG. 1 is an isometric view of an exemplary cell-cultivation apparatus including multiple copies of a culture vessel that are held in alignment with one another by a frame in a standard microplate format, where each copy of the culture vessel defines a flow path for liquid through an upper region of a row of communicating wells, to permit exchange of media, and particularly molecules and/or cellular products therein, between two or more of the wells containing respective cell cultures.

The present disclosure provides methods, systems, and apparatus for cultivating cells in media-exchanging wells. In an exemplary method of cell cultivation, a device may be selected that includes a row of wells, and a first reservoir and a second reservoir located at opposite ends of the row of wells. Each well may have a lower portion and an upper portion. The lower portion of each well of at least two of the wells may contain a cell culture in contact with a medium. Liquid may be transferred between the first reservoir and the second reservoir at least partly along a flow path defined by the device and extending through the upper portion of each well of the row of wells, such that molecules of the media are exchanged between or among the at least two wells.

The methods, systems, and apparatus disclosed herein have at least several advantages over known cultivation methods and systems. The culture vessel of the present disclosure defines a flow path passing through an upper portion instead of a lower portion of each well. This flow path is spaced from and thus avoids the cell cultures located at the bottoms of the wells. Accordingly, there is less chance of undesired migration of cells to different wells, which would contaminate the cell cultures. Moreover, this flow path does not require elongated microfluidic channels, which can become clogged with cells or debris. Furthermore, use of this flow path can generate enough turbulence to exchange molecules and/or cellular products of and/or in media in the lower portions of the wells, without disturbing the cell cultures therein.

Copies of the culture vessel may be held by a frame to create a plate having a microplate format of wells. Microplate-handling robotics and fluidics then may be utilized to provide automated manipulation and substantially higher throughput than with known culture vessels having media-exchanging wells.

Further advantages are provided by the design of the wells and/or reservoirs. For example, the wells may have one or more planar, side windows optimized for light sheet fluorescence microscopy, to facilitate imaging of a sub-millimeter, three-dimensional cell culture, such as a spheroid or organoid of about 100 to 600 micrometers in diameter, in one or more of the wells. The shape of the wells may differ from conventional U-shaped or V-shaped wells. Each well may have quasi-vertical, planar side walls in the lower portion of the well. The side walls may be transparent, to enable light sheet illumination. Alternatively, or in addition, each of the reservoirs may be configured to substantially empty itself into the row of wells at a relatively small incline of the culture vessel.

The present disclosure provides assay design and consumables for organ-on-a-chip and/or body-on-a-chip models, either as hardware alone, with detailed protocols, or plates prepared with live cells and ready for compound testing. These methods and systems can provide valuable information related to a selected biological model, and are compatible with imaging and automation and easy to set up.

The present disclosure also provides a culture vessel suitable for organ-on-a-chip and body-on-a-chip assays compatible with imaging systems, plate readers, and other instruments. The culture vessel may have wells with a shape (e.g., a U-shape or V-shape) for forming spheroids/organoids. The culture vessel may contain spheroids or organoids of up to 300-600 um in size (or more), which may be formed by introducing the appropriate primary or induced pluripotent stem cell (iPSC)-derived cells into the wells, with or without a pre-formed matrix already present in the wells. The introduced cells may, for example, form organoids in 2-4 days, while the wells are in liquid isolation from one another (i.e., no media exchange occurs between or among the wells). At any desired time, the culture vessel allows interaction of the different cell types with each other by media exchange (i.e., exchange of media components, such as molecules and/or cellular products between/among wells). Liquid flow for media exchange between or among the wells may be driven by gravity flow (e.g., using a rocking platform) and/or with a pump. (Cells can be grown in the culture vessel while supported by a rocking platform inside an incubator.) Examples of interacting cells include liver-heart models, liver-heart-brain models, tumor-liver models, gut-liver-kidney models, or other multi-organ models of desired format and combinations.

The culture vessel may be a strip of wells connected to one another by a channel. When tilted, media flows from a reservoir to the first well, second well, etc., until all excess media is collected in another reservoir at the opposite end of the strip.

The culture of cells with media exchange, as disclosed herein, enables investigation of interactions between different (normal/transformed) cell types or tissues each cultured in a two-dimensional or three-dimensional format. These interactions can be mediated by the exchange of cells and/or cellular products transferred in liquid, including, but not limited to, cytokines, chemokines, growth factors, lipids, circulating DNAs/RNAs, eukaryotic cells, bacteria, and/or viruses.

Exemplary studies that may be performed with the culture vessels and cultivation methods disclosed herein are listed below, without limitation.

(1) Liver and cardiac spheroids may be cultivated with media exchange in different wells of the same culture vessel. Compounds that do not produce a direct effect on a cardiac spheroid can be tested for a cardiac effect resulting from metabolism of the compounds to potentially-active derivatives by the liver spheroid.

(2) Liver and kidney cells or tissues may be cultivated with media exchange in the same culture vessel to study drug metabolism.

(3) Heart, liver, and neuronal cells may be cultivated with media exchange in the same culture vessel to study toxicity effects of chemicals.

(4) Tumor cells, and normal liver, neuronal, and cardiac cells may be cultivated with media exchange in the same culture vessel to study effects of anti-cancer drugs and related toxicities.

(5) Vascular cells and cardiac cells (or other tissues) may be cultivated with media exchange in the same culture vessel to study inflammation and the impact of different tissues.

(6) Effects of bacteria or viruses on different tissues may be investigated.

(7) Effects of T cells or other immune cells on normal tissues may be investigated.

(8) Effects of T cells or other immune cells on malignant tissues may be studied.

(9) Five or more different cell types representing basic tissues may be cultivated with media exchange according to the "body-on-a-chip" concept.

Further aspects of the present disclosure are described in the following sections: (I) definitions, (II) system, apparatus, and method overview, (III) examples, and (IV) selected aspects.

I. DEFINITIONS

Technical terms used in this disclosure have meanings that are commonly recognized by those skilled in the art. However, the following terms may be further defined as follows.

Cell—the basic structural, functional, and biological unit of a living organism. Cells may be eukaryotic or prokaryotic. Exemplary cells include stem cells, established cells (e.g., cell lines), primary cells, cells of a tissue sample, transfected cells, cells from a clinical sample (e.g., a blood sample, a fluid aspirate, a tissue section, etc.), and/or the like.

Cell culture—a set of cells being cultivated together in the same compartment, such as in the same well. The set of cells may be in contact with and surrounded by a medium and/or media.

A 2D (two-dimensional) cell culture is a cell culture having its cells arranged at least predominantly along a surface of a compartment, such as a well, and optionally attached to the surface. A 2D cell culture typically has an average thickness, measured orthogonally to the surface (e.g., vertically), that is only a small fraction of a length and a width of the cell culture, measured along the surface (e.g., horizontally). The average thickness may be no more than about one or two cells. The surface of the compartment may be planar or concave, among others. A 2D cell culture may be a monoculture (i.e., including substantially only one type of cell), or a coculture (i.e., including two or more different types of cells).

A 3D (three-dimensional) cell culture is a cell culture forming a three-dimensional cluster of cells. The average thickness of a 3D cell culture, measured orthogonally to an adjacent supporting surface (e.g., vertically), may be at least 5 or 10 cells, among others. The cluster may be described as an aggregate. Exemplary 3D cell cultures include spheroids and organoids. Accordingly, a 3D cell culture may be a monoculture of a single cell type or a coculture of different cell types.

Cellular product—any molecule, molecular complex, macromolecular assembly, organelle, or particle produced by at least one cell. The cellular product may be released into liquid surrounding a cell culture by any suitable process, such as secretion (e.g., exocytosis), budding, cell lysis, or the like. Cellular products and/or cells may be exchanged between/among wells.

Cell cultivation—fostering the survival, health, growth, and/or proliferation of living cells in an artificial environment.

Culture vessel—a device for cultivation of at least one cell culture or any array of cell cultures. The devices disclosed herein may be single-use devices (consumables) or may be re-used.

Light—optical radiation, including ultraviolet radiation, visible radiation (i.e., visible light), and/or infrared radiation.

Medium—an aqueous composition for cultivation of cells. The composition may be liquid or semi-solid. The composition may include a carbon source (e.g., glucose), inorganic salts, vitamins, and growth regulators, among others. The term "media," as used herein, means at least one medium, and may, for example, refer to separate volumes of a medium, a first medium and a second medium of different compositions, a medium of substantially the same composition in contact with different/separate cell cultures, or a combination/mixture of previously isolated volumes of the same medium.

Organoid—a three-dimensional aggregate of cells of different types produced in vitro and having some resemblance to an organ, such as exhibiting a realistic histology of organ-specific tissue. The cluster of cells may be generated by seeding a matrix, such as a hydrogel, with a small number of stem cells. The stem cells then proliferate, differentiate, and self-organize within the matrix, while using the matrix as a scaffold.

Spheroid—a three-dimensional cluster of cells of a single type.

II. SYSTEM, APPARATUS, AND METHOD OVERVIEW

This section provides an overview of systems, apparatus, and methods for cultivating cells in wells that communicate with one another structurally to permit sharing liquid between wells in a controllable manner by gravity-driven flow and/or pump-driven flow; see FIGS. 1-12. Further aspects of the systems, apparatus, and methods that may be suitable are described elsewhere herein, such as before Section I and in Sections I, III, and IV.

FIG. 1 shows an exemplary cell-cultivation apparatus 40 (also called a plate) including a frame 42 and copies of a culture vessel 50 having wells 52 that communicate with one another; FIGS. 2-7 shows a single culture vessel 50 in isolation. Frame 42 may be configured to removably hold copies of culture vessel 50 in alignment with one another to form a rectangular array of wells 52. The rectangular array may have a standard, ANSI/SBS microplate well spacing (e.g., a center-to-center well spacing of 18, 9, or 4.5 mm). Each culture vessel 50 may have a row 54 of at least two, three, four, or five wells 52, among others, for containing at least two different cell cultures. In the depicted embodiment, row 54 has eight wells 52. Wells 52 may (or may not) have a uniform spacing from one another in row 54 and may (or may not) be substantially uniform in size and/or shape.

First and second reservoirs 56, 58 may be located at opposite ends of row 54 for fluid communication with adjacent wells 52. Reservoirs 56, 58 may be structured as wells, as shown here, and thus may be loadable with fluid from above using a pipette. Accordingly, in some embodiments, wells 52 may be described as cell wells and reservoirs 56, 58 as reservoir wells. The size and/or shape of reservoirs 56, 58 may be different from wells 52. For example, reservoirs 56, 58 may have a larger fluid-holding capacity than wells 52, and/or may be configured to be drained more efficiently and/or completely, as described below. In the plate of FIG. 1, each reservoir 56, 58 replaces two wells of a standard microplate format (e.g., a 96-well microplate forming an 8-by-12 array of wells). In other examples, each reservoir may replace only one or at least three wells of a standard microplate format.

Figure 2:
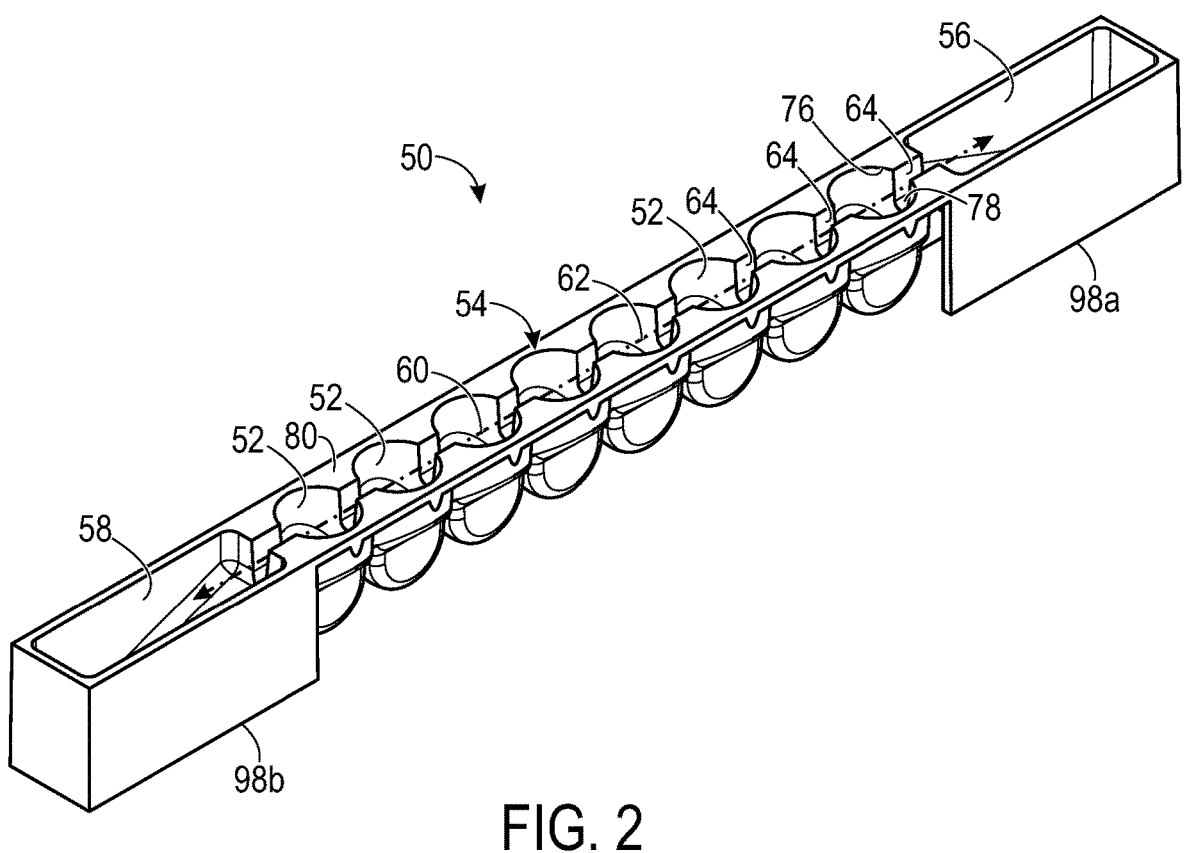
FIG. 2 is an isometric view of one of the copies of the culture vessel of FIG. 1 taken in isolation.
Figure 3:
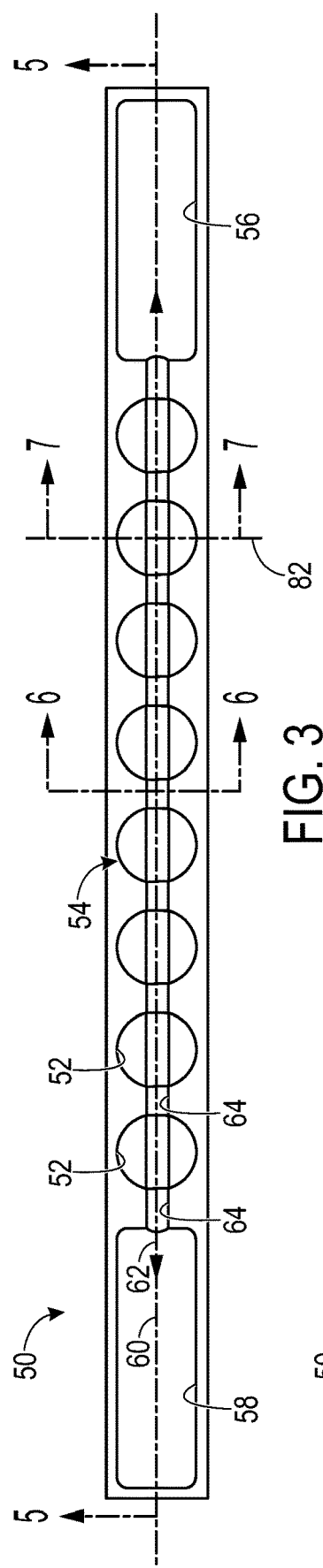
FIG. 3 is a top view of the culture vessel of FIG. 2.

Culture vessel 50 may be elongated to define a longitudinal axis 60, which may be linear (see FIGS. 1 and 2). Wells 52 and reservoirs 56, 58 may be arranged along longitudinal axis 60. Accordingly, the culture vessel may be described as a strip.

A flow path 62 for fluid travel between wells 52 is defined by culture vessel 50. The flow path may be formed by a channel. In the depicted embodiment, flow path 62 extends from first reservoir 56 to second reservoir 58, and vice versa, via row 54 of wells 52. Flow path 62 may at least generally follow longitudinal axis 60. In the depicted embodiment, flow path 62 is on longitudinal axis 60. In other embodiments, flow path 62 may be parallel to, but offset from, longitudinal axis 60, linear but not parallel to longitudinal axis 60, or nonlinear (such as meandering (see Example 2)), among others.

Flow path 62 may extend through passages 64 (interchangeably called openings) that allow wells 52 to communicate with one another and reservoirs 56, 58 (see FIGS. 2, 3, and 5-7). Each passage 64 may provide fluid communication between an adjacent pair of wells 52, or between a well 52 at one end of row 54 and a reservoir 56 or 58. Passages 64 may be located in an upper region 66 of culture vessel 50, at an upper portion 68 of wells 62, and cells may be contained in a lower portion 70 of wells 62. This arrangement allows control of liquid flow between wells 52, and/or between row 54 and reservoirs 56, 58. For example, liquid travel can be controlled by adjusting the level of liquid in one or more of the wells and/or reservoirs, and/or by adjusting the orientation of longitudinal axis 60 (e.g., from horizontal to sloped or vice versa). The lower portion of each well may be called a cell-containing portion, and the upper portion of each well may be called an exchange portion.

Passages 64 may have any suitable position, size, and shape. Each passage 64 may be formed in a wall 72 between adjacent wells 52 or between a well 52 and one of reservoirs 56, 58. The passage may extend to a top edge 74 of wall 72 and/or to a top lip 76 of a well(s) 62 and/or a reservoir 56, 58, to form a recess 78, such as a slot, in a top surface 80 of culture vessel 50. Alternatively, each passage 64 may be positioned under and spaced from top edge 74, top lip 76, and top surface 80. Passage 64 may have a passage width that is substantially less than the well width of an adjoining well 52, each measured parallel to a horizontal transverse axis 82 (see FIG. 3). For example, the passage width may be less than about one-half, one-third, or one-fourth the well width. Narrow passages 64 may advantageously encourage more turbulent flow of liquid, to promote more mixing of liquid within each well 52, and thus more efficient exchange among wells 52 of cellular products, additives (e.g., reagents and/or test compounds), and/or suspended cells, among others. Each passage 64 may or may not be elongated at least generally vertically (i.e., within 45 degrees of precisely vertical). Passages 64 may be arranged along a straight line (e.g., longitudinal axis 60 in the depicted embodiment) or at least subset of the passages may be offset laterally from a straight line to encourage more turbulent flow (see Example 2).

Each well 52 may have any suitable shape. The well may narrow stepwise and/or with a taper, as it extends downward between the top and bottom of the well, in a vertical longitudinal plane (containing longitudinal axis 60), and/or in a vertical transverse plane (parallel to transverse axis 82). This narrowing can be configured to encourage clustering of introduced cells at the bottom of the well, in order to form a 3D cell culture. In some embodiments, the well may taper with the same constant slope in a vertical longitudinal plane and a vertical transverse plane, to produce a lower portion 70 having a conical (e.g., frustoconical) shape (e.g., see Example 3). In some embodiments, the well may taper with a decreasing slope in one or both of these planes to form a lower portion 70 having a concave surface 84 that is concave in a vertical longitudinal plane (see FIG. 5) and/or a vertical transverse plane. Accordingly, a bottom inner surface region 86 (i.e., the floor) of the well may be flat (e.g., see Example 3) or nonplanar, such as rounded (in one or both of the planes) (e.g., see FIGS. 5 and 7 and Examples 1, 3, and 5). Similarly, an outer bottom surface region 88 opposite inner surface region 86 may be flat (e.g., see Examples 1 and 3) or rounded (e.g., convex in one or both planes (see FIGS. 5 and 7 and Examples 1, 2, 3, and 5). The area of inner surface region 86 may be much smaller than the horizontal top area inside well 52, such as less than about 20%, 10%, or 5% of the top area.

The geometry of each well 52 may be chosen according to its intended use for cell cultivation (e.g., for a 2D versus a 3D cell culture) and imaging (e.g., conventional imaging versus light sheet microscopy). Wells 52 of culture vessel 50 permit lateral illumination (e.g., for light sheet microscopy) and/or lateral light collection, at least generally parallel to transverse axis 82. Each well 52 may have at least one or a pair of transparent optical windows 90 in lower portion 70 formed by opposing side walls 92. Each optical window 90 may be substantially planar and at least generally vertical (i.e., within 45 degrees of exactly vertical, such as within 30, 20, or 10 degrees of vertical) (also see Example 1). If a pair of transparent optical windows 90 are formed by well 52, they may be arranged opposite one another and spaced from one another parallel to transverse axis 82.

Figure 8:
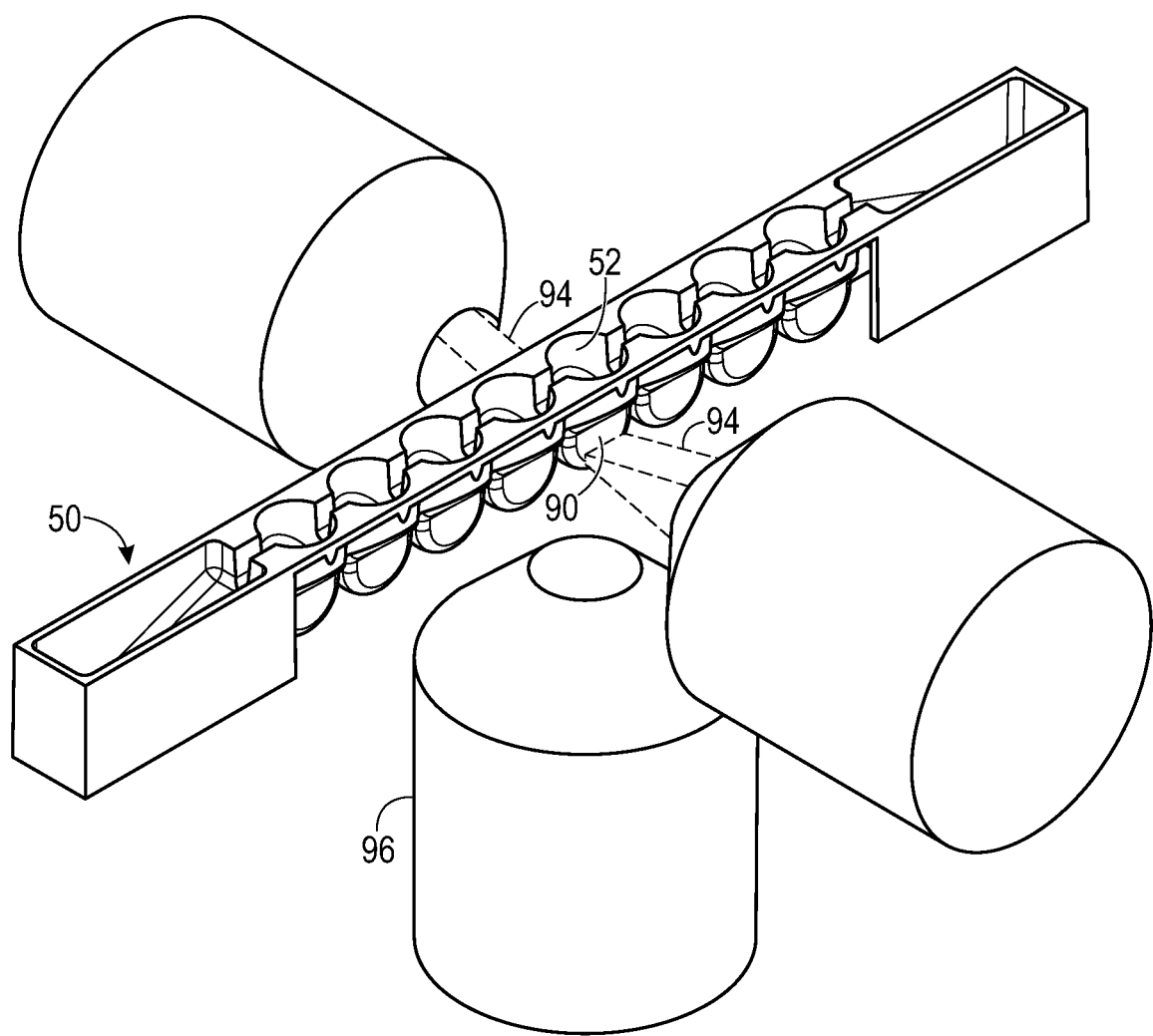
FIG. 8 is a view of selected aspects of an exemplary light sheet microscopy configuration for capturing an image of cells contained in one of the wells of the culture vessel of FIG. 2.

FIG. 8 illustrates a light sheet imaging configuration to capture images of cells contained in one or more wells 52 of culture vessel 50. One of wells 52 may be illuminated with at least one light sheet 94 incident on, and transmitted into the well through, one or both optical windows 90. In the depicted embodiment, one well 52 is being illuminated from opposite lateral sides by a pair of horizontal light sheets 94 formed by cylindrical lenses. Light, such a fluorescence induced by light sheets 94, may be gathered with an objective 96 located below the well.

Figure 4:
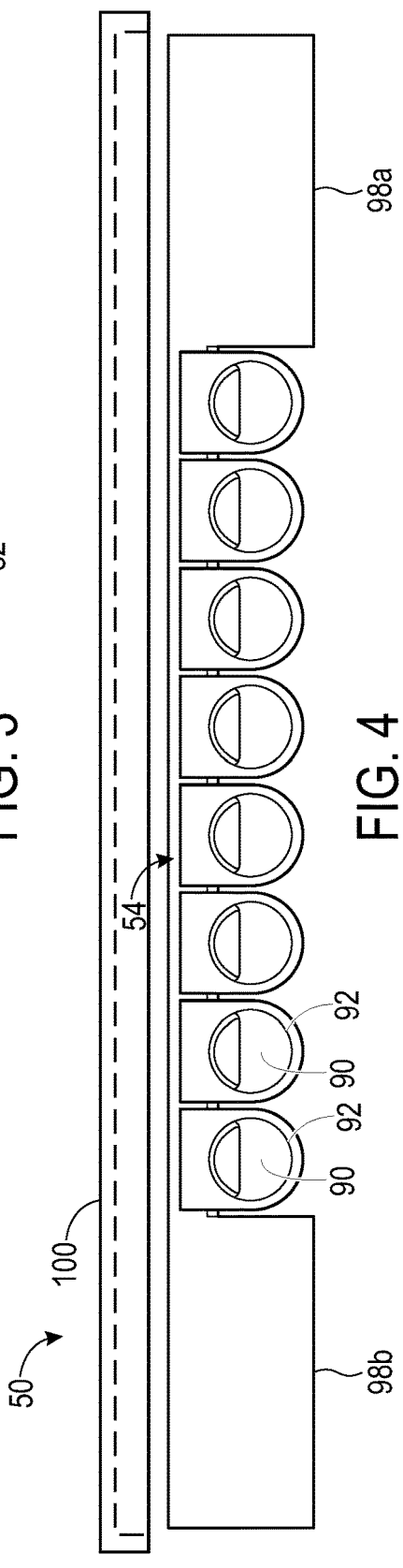
FIG. 4 is a side view of the culture vessel of FIG. 2.
Figure 5:
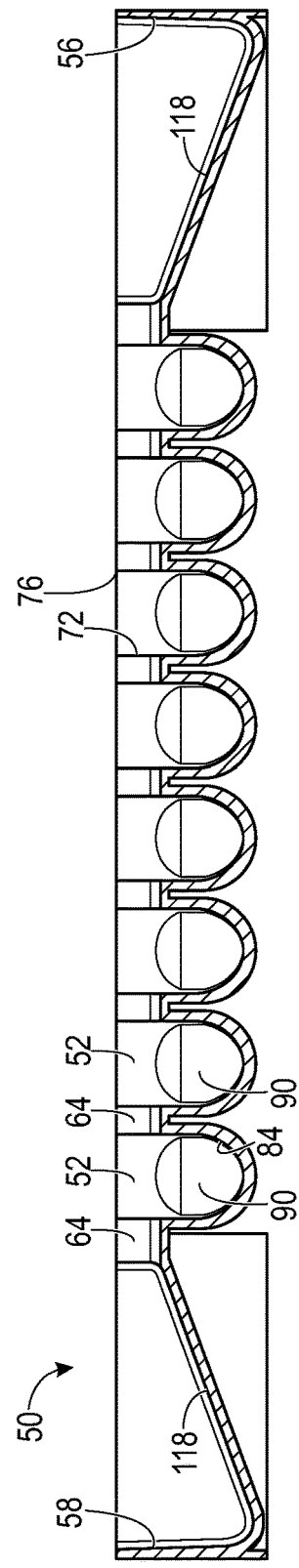
FIG. 5 is a sectional view of the culture vessel of FIG. 2, taken generally along line 5-5 of FIG. 3.
Figure 6:
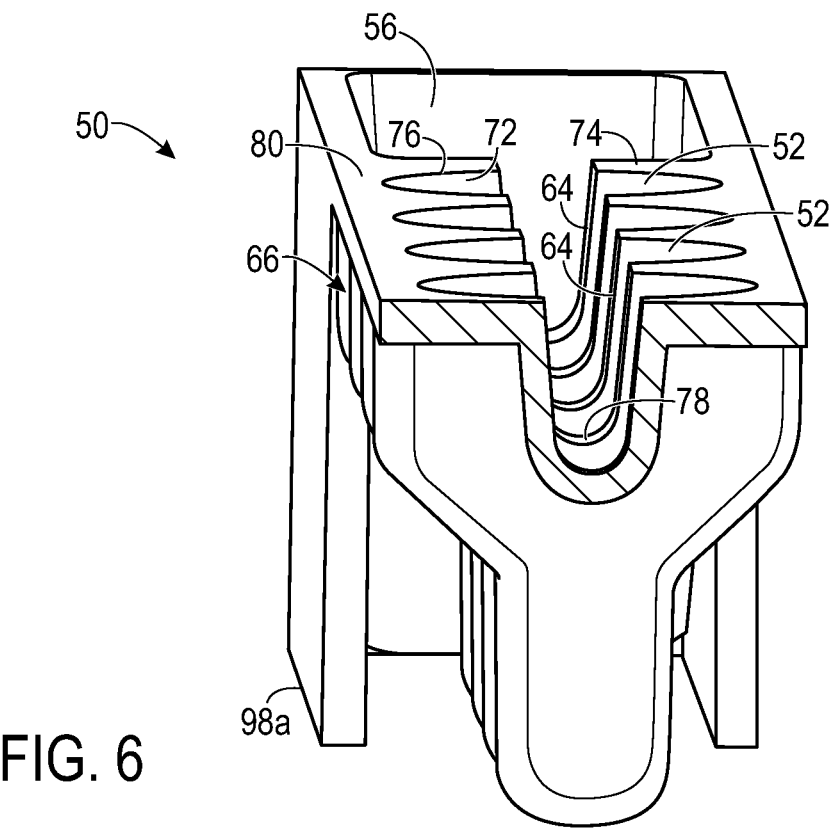
FIG. 6 is another sectional view of the culture vessel of FIG. 2, taken generally along line 6-6 of FIG. 3.
Figure 7:
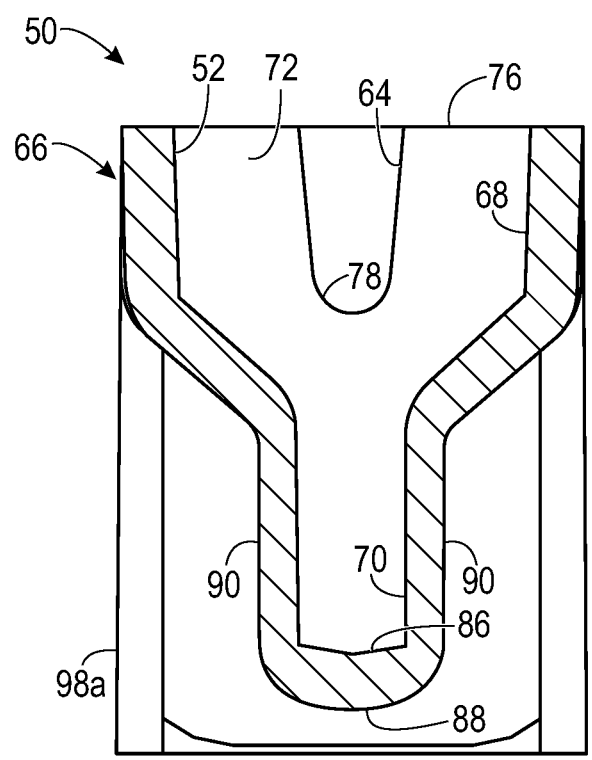
FIG. 7 is yet another sectional view of the culture vessel of FIG. 2, taken generally along line 7-7 of FIG. 3.

Culture vessel 50 may be configured to support itself stably and in a level orientation on a horizontal surface (see FIGS. 2, 4, and 6). For example, culture vessel 50 may have a base portion to contact the horizontal surface and optionally elevate row 54 of wells 52 above the horizontal surface. In the depicted embodiment, the base portion is formed by a pair of spaced feet 98a, 98b located at opposite ends of the culture vessel, optionally adjacent and/or at least partially formed by reservoirs 56, 58.

Culture vessel 50 may be covered with a removable lid 100 (see FIG. 4) that functions like a standard lid of a tissue culture dish. The lid may be placed over the top of culture vessel 50 to cover row 54 of wells 52 and, optionally, reservoirs 56, 58, and then removed when fluid is being added to or removed from the culture vessel. Lid 100 may be sized to cover only one copy or multiple copies of culture vessel 50. Accordingly, all wells 52 of cell-cultivation apparatus 40 may be covered with a single lid 100 and/or a separate lid may be used to cover each copy of culture vessel 50 (also see FIG. 1).

FIGS. 9 and 10 illustrate exemplary configurations of culture vessel 50 containing a plurality of cell cultures 102 and liquid 104 (e.g., media) in wells 52. Each cell culture 102 may be composed of any suitable number of cells 106 and may include one, two, or more different cell types, and each may be 2D or 3D. Each cell culture 102 may be a different type or some of the cell cultures may be replicates (e.g., wells 52 may contain four different types of cell cultures 102, each present twice, two different types, each present four times, or the like). Eight cell cultures 102 are shown here, but in some cases as few as two cell cultures may be used. Accordingly, one, two, or more wells 52 may contain liquid 104 but no cells or may contain neither liquid nor cells, before liquid transfer is initiated between wells. Liquid 104 may be media of essentially the same composition (except different cellular products), or different compositions, before liquid transfer among wells 52.

FIG. 9 shows culture vessel 50 before transfer of liquid 104 among wells 52. Culture vessel 50 is horizontal and the level of liquid 104 is below each passage 64. Accordingly, the contents (liquid, cell culture, cellular products, etc.) of each well 52 are isolated from the contents of each other well 52 and reservoirs 56, 58.

FIG. 10 shows culture vessel 50 after net transfer of liquid 104 from first reservoir 56 to second reservoir 58 (compare with FIG. 9). Culture vessel 50 has been placed on rocking platform 108, which rocks the culture vessel alternately in opposite rotational directions, indicated by a double-headed rotation arrow at 110. As culture vessel 50 is rotated from the level orientation of FIG. 9 to the inclined orientation of FIG. 10, first reservoir 56 becomes elevated with respect to wells 52 and second reservoir 58, and liquid 104 enters passages 64 and flows along flow path 62, indicated by representative flow arrows at 112, 114, and 116 (also see FIGS. 2 and 3). More specifically, liquid 104 flows from first reservoir 56 to an adjacent well 52, indicated at 112, between adjacent wells 52, indicated at 114, and from an adjacent well 52 into second reservoir 58. Rocking platform 108 then may rotate in the opposite direction to elevate second reservoir 58 above first reservoir 56, which drives flow of liquid 104 along flow path 62 in the opposite direction, thereby returning a volume of liquid 104 to first reservoir 56. In the process, the suspended/soluble contents of each well 52 are being distributed to all of the wells, to permit cellular products of cells cultures 102 to affect one another (e.g., stimulating/inhibiting growth, proliferation, differentiation, migration, organization, apoptosis, etc.).

Each reservoir 56, 58 may have a ramp 118 that slopes downward from an adjacent passage 64 at one end of row 54 (see FIG. 9). The angle of slope for ramp 118 with respective to horizontal may, for example, be less than about 50, 45, 40, 35, or 30 degrees, among others. Ramp 118 may allow each reservoir 56, 58 to be substantially drained of liquid 104 by tilting culture vessel 50 to a slant of at least the slope of ramp 118 (e.g., as shown in FIG. 10). As a result, liquid flow in culture vessel 50 can be driven efficiently by rocking platform 108 using a smaller range of angular motion.

Figure 11:
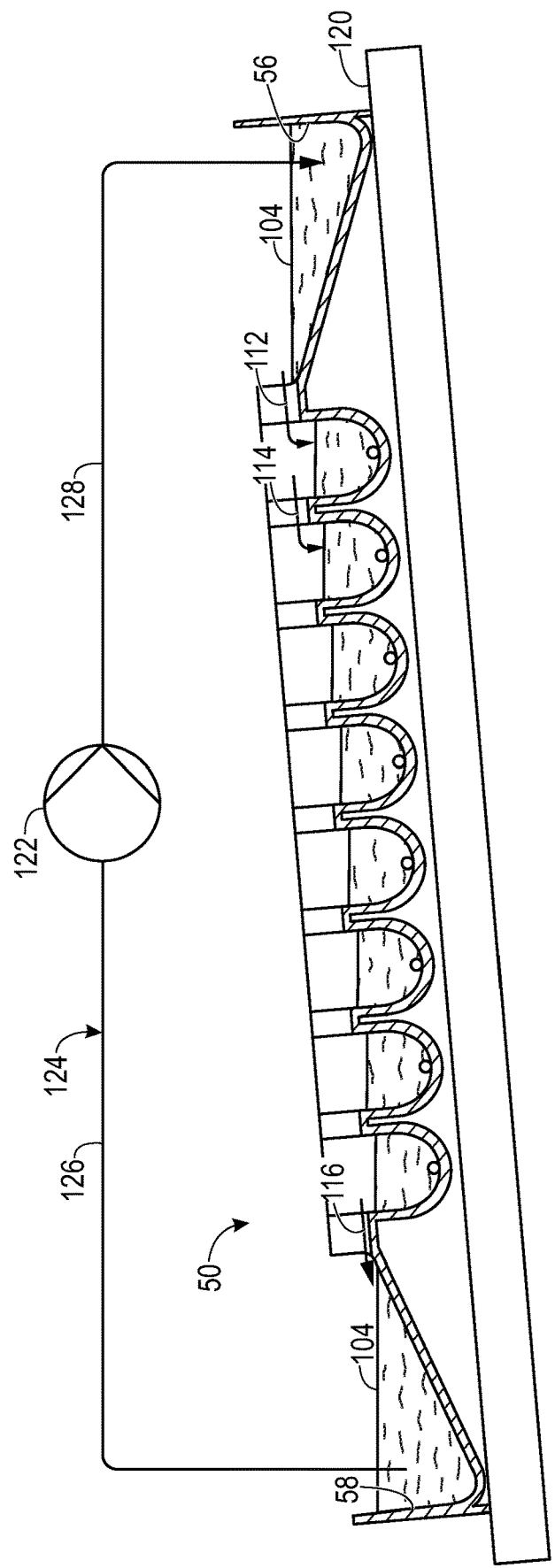
FIG. 11 is still another sectional view of the culture vessel of FIG. 2, taken generally as in FIG. 10, except with the culture vessel supported at a fixed incline, to drive flow of liquid with gravity from the first reservoir to the second reservoir, and with a pump being utilized to return liquid to the first reservoir from the second reservoir via an at least partially external flow path.

FIG. 11 illustrates a pump-based strategy for returning liquid to first reservoir 56 from second reservoir 58 (compare with FIG. 10). Culture vessel 50 may be supported at a fixed slant on a sloped platform 120 such that first reservoir 56 is elevated with respect to second reservoir 58, as depicted. This sloped orientation of culture vessel 50 encourages gravity-driven flow of liquid 104 along flow path 62 (also see FIGS. 2 and 2), indicated at 112, 114, and 116, from first reservoir 56 to second reservoir 58. A pump 122 may be utilized to actively transport liquid 104 from second reservoir 58 back to first reservoir 56 via an at least partially external flow path 124 defined by pump 122 and associated upstream and downstream conduits 126, 128. The rate of liquid flow along external flow path 124 driven by pump 122 may substantially match that along vessel-defined flow path driven by gravity. The incline of sloped platform 120 may be adjusted, if necessary, to increase or decrease the flow rate of liquid 104 along internal flow path 62. In some embodiments, culture vessel 50 may be supported on a horizontal surface instead of a sloped platform when pump 122 is utilized.

Figure 12:
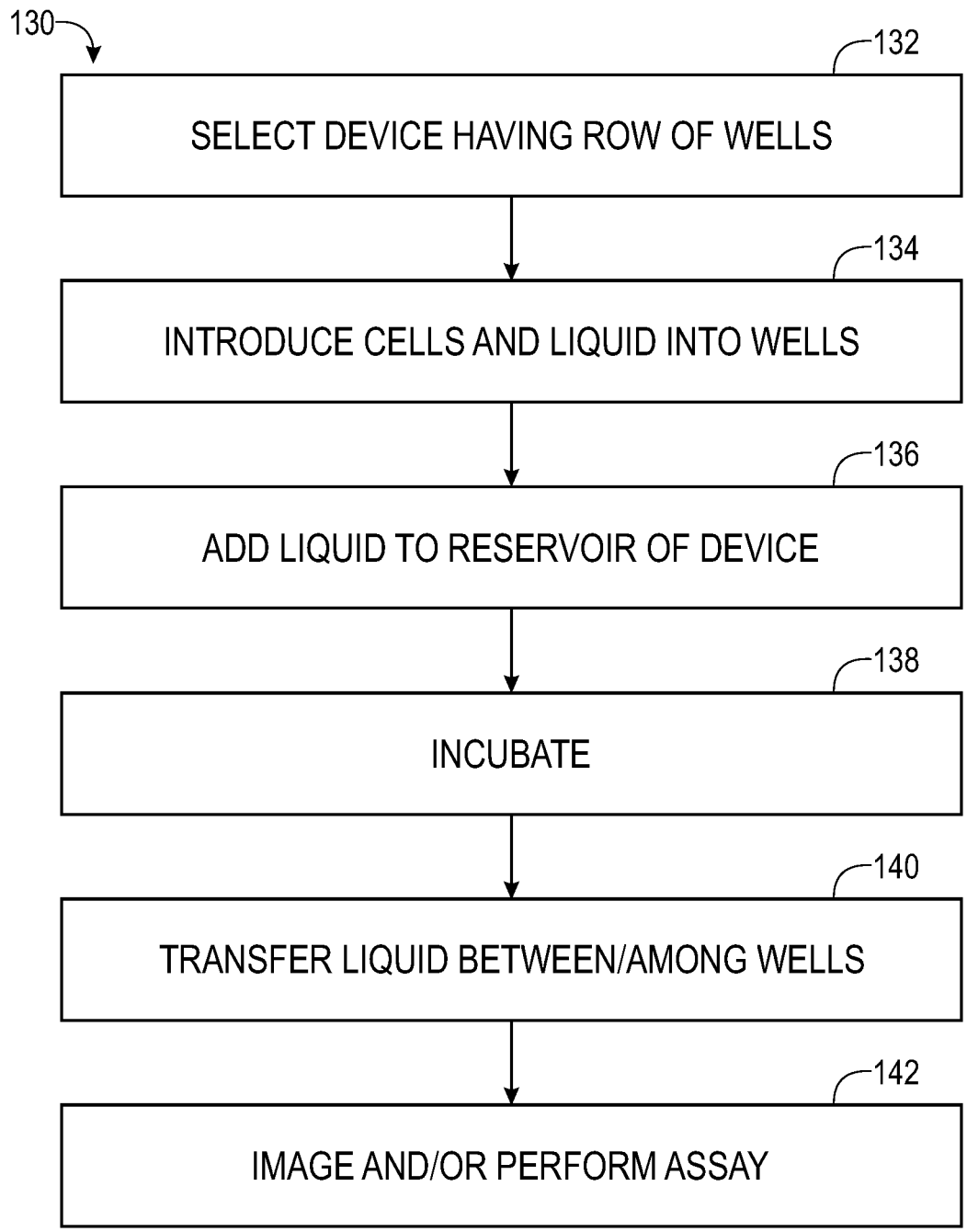
FIG. 12 is a flowchart of exemplary steps that may be performed in a method of cell cultivation using any of the culture vessels of the present disclosure.

FIG. 12 is a flowchart of exemplary steps that may be performed in a method 130 of cell cultivation using culture vessel 50 or any of the other culture vessels of the present disclosure. The steps may be performed in any suitable order and combination, and may be modified by or combined with any other suitable steps and features disclosed elsewhere herein.

A device, such as culture vessel 50, may be selected indicated at 132. The device may have any suitable combination of features and properties described herein.

Cells and liquid (i.e., media) may be introduced into wells of the device, indicated at 134. At least one cell may be introduced into each well of at least two, three, four, five, or more wells of the device. A separate volume of the same or different medium, optionally containing at least one cell to be introduced, may be dispensed into each well. The volumes of media introduced to the wells may be small enough to keep the level of the media in each well below the flow path defined by the device. In some embodiments, a preformed three-dimensional cluster of cells, such as a preformed spheroid or organoid may be introduced into one or more wells of the device. In some embodiments, a matrix for organoid formation also may be disposed in (e.g., formed in) at least one well in which an organoid is to be formed, optionally before cells are introduced into the at least one well. The matrix may be located on the inside bottom of the well.

Liquid may be introduced into one or more reservoirs of the device, indicated at 136. The liquid may be media.

The device and its contents may be incubated, indicated at 138. The incubation may be at a suitable temperature for cultivation of the cells, optionally in a controlled atmosphere. During incubation, the wells and reservoirs of the device may be in liquid isolation from one another. In other words, liquid is not transferred among the wells and reservoirs. Incubation may be performed for any suitable length of time, such as at least 0.5, 1, 2, 3, 4, or more days, to permit cells to sediment, stabilize, aggregate, grow, divide, and/or the like. Incubation may be performed before or after step 136 above, and may be performed before liquid (e.g., media) is transferred among the cells and reservoirs.

Liquid (e.g., media) may be transferred between (two) or among (three or more) wells of the device, indicated at 140. Liquid transfer generally drives flow of liquid unidirectionally or in alternating directions along the flow path defined by the device. Flow can be driven by gravity (e.g., on a rocking platform), a pump (e.g., with the device horizontal or inclined), or both, among others. In some cases, a test compound or other test substance may be added to a well/reservoir of the device, and liquid transfer may cause the test compound/substance to interact with cells in each of the wells.

Cells in the device may be imaged and/or an assay may be performed on cells/liquid (e.g., media) in the device, indicated at 142. For example, conventional imaging, confocal imaging, or light sheet imaging, among others, may be conducted, to obtain at least one optical or recorded image of at least part of a cell culture contained in at least one of the wells. Exemplary instruments for imaging include conventional microscopes, confocal microscopes, light sheet fluorescence microscopes, the ImageXpress® Micro or ImageXpress® Pico imaging systems, or the like.

III. EXAMPLES

This section describes further examples of methods, systems, and apparatus for cultivating cells in wells configured to exchange liquid (e.g., media) in a controllable manner. These examples are intended for illustration only and should not limit the entire scope of the invention. Aspects and features of these examples may be combined with one another and with those described elsewhere herein, such as in Sections I, II, and IV, in any suitable combination.

Example 1. Culture Vessel for Light Sheet Microscopy

Figure 13:
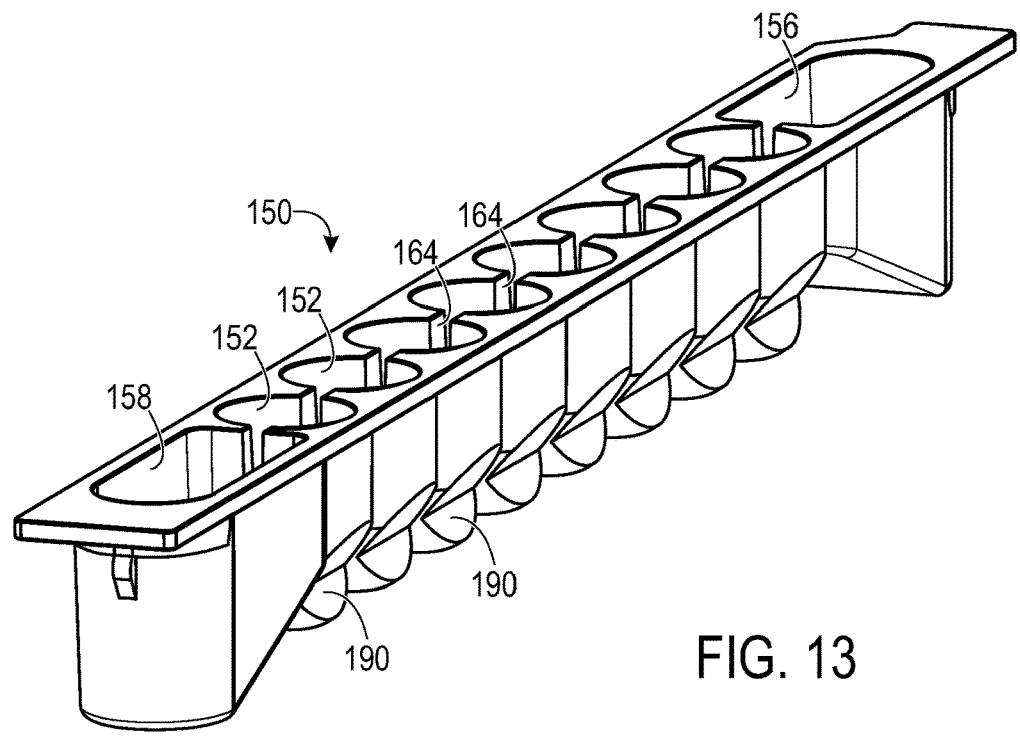
FIG. 13 is a view of another exemplary culture vessel defining a flow path for liquid, such as media, through an upper region of a row of wells.
Figure 14:
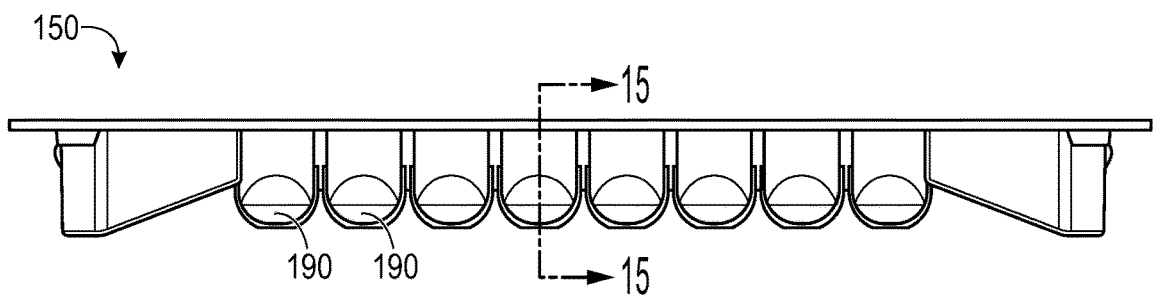
FIG. 14 is a side view of the culture vessel of FIG. 13.
Figure 15:
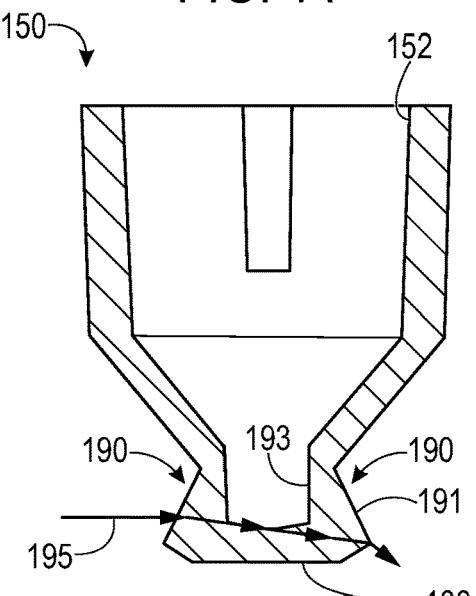
FIG. 15 is a sectional view of the culture vessel of FIG. 13, taken generally along line 15-15 of FIG. 14.

This example describes another exemplary culture vessel 150 configured for media exchange among wells 152 and imaging by light sheet microscopy; see FIGS. 13-15.

Culture vessel 150 is related to culture vessel 50 (e.g., see FIGS. 1-7). For example, culture vessel 150 has a row of U-shaped wells 152, and a first reservoir 156 and a second reservoir 158 at opposite end of the row of wells 152. Passages 164 provide communication between wells 152 and between ends of the row of wells 152 and reservoirs 156, 158.

Each well 152 may have a flat (planar, horizontal) outer surface region 188 at the bottom of the well (see FIG. 15). At least one or a pair of transparent optical windows 190 may be formed on opposite lateral sides of the well (see FIGS. 13-15). Optical windows 190 may serve a similar purpose for light sheet illumination as optical windows 90 of culture vessel 50 (e.g., see FIG. 8). However, the orientation of outer window surface 191 may be more offset from vertical and less parallel to inner window surface 193 than corresponding window surfaces of culture vessel 50 (see FIGS. 7 and 15). The orientation of these inner and outer window surfaces permits a light sheet 195 to enter the well from the side and to be refracted by the window surfaces, such that the illumination of the inside nadir of the U-shaped well is possible (see FIG. 15).

A 3D cell cluster, such as a spheroid or organoid, is most likely to be found near or at the inside nadir of the well. The cluster may be very small (100-300 μm). The bottom of the U-shaped well already elevates about 160 μm from the center to the side walls. The U-shape is advantageous as it may help cell clusters to form a spherical shape.

Example 2. Culture Vessel with Meandering Flow Path

This example describes an exemplary culture vessel 250 configured for controllable media exchange among wells 252 and defining a meandering flow path 262 between reservoirs 256, 258; see FIGS. 16-20.

Culture vessel 250 has passages 264 formed as lateral, at least generally vertical, slots. Each passage is formed at least partially in one of transverse walls 272, in the upper region of culture vessel 250. The passage is located between a pair of adjacent wells 252, or between an end well 252 and one of reservoirs 256, 258. Each passage 264 may be a slot that is elongated at least generally vertically. The passage may extend to a top edge of transverse wall 272 or its upper extent may be spaced below this top edge. Each passage 264 may be defined cooperatively by a transverse wall 272 and one of opposite longitudinal side walls 273 of culture vessel 250, as depicted, or completely by a transverse wall 272, among others.

Figure 19:
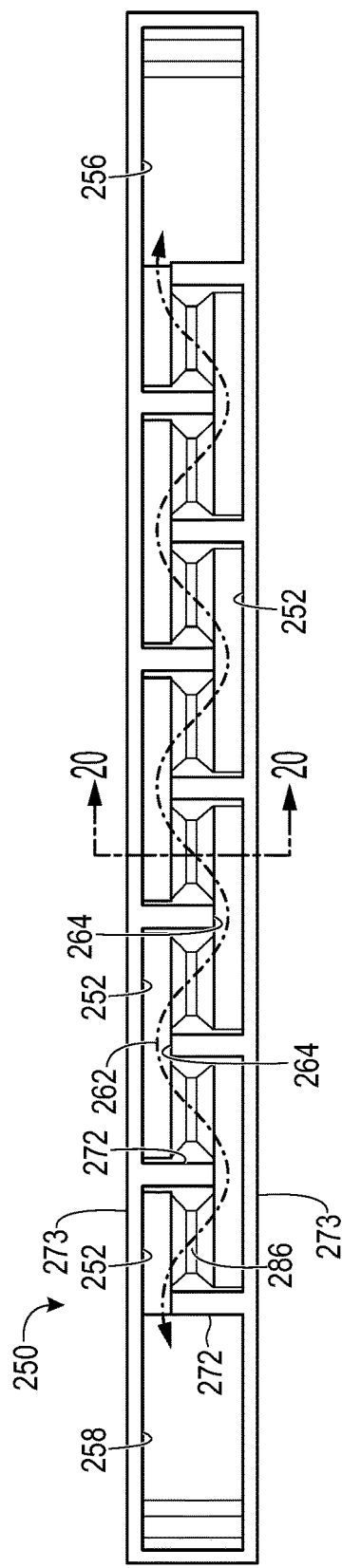
FIG. 19 is a top view of the culture vessel of FIG. 16, with the meandering flow path indicated.

Flow path 262 is nonlinear (see FIG. 19 and compare with flow path 62 of culture vessel 50 in FIG. 2). More specifically, at least a subset of passages 264 may be offset from a central vertical plane containing the longitudinal axis defined by culture vessel 250. In the depicted embodiment, each passage 264 is offset laterally (none is visible in the central sectional view of FIG. 18). Culture vessel 250 may define a serpentine flow path, as shown. For example, passages 264 may be offset successively in alternating horizontal directions from the central vertical plane. Meandering flow of media along flow path 262 may generate greater turbulence than flow along linear flow path 62 (see FIG. 2), which may enhance media exchange when driving flow along the flow path between reservoirs 256, 258 (e.g., by rocking culture vessel 250).

Each well 252 of culture vessel 250 has a rounded shape in the bottom region of lower portion 270, in a longitudinal vertical plane. In the depicted embodiment, in this bottom region, the inner and outer well surfaces, oriented transverse to the longitudinal vertical plane, are cylindrical. This rounded shape at the inside bottom of the well may limit movement of a three-dimensional cluster, such as a spheroid, in the well if the culture vessel is being rocked to drive fluid flow.

Figure 16:
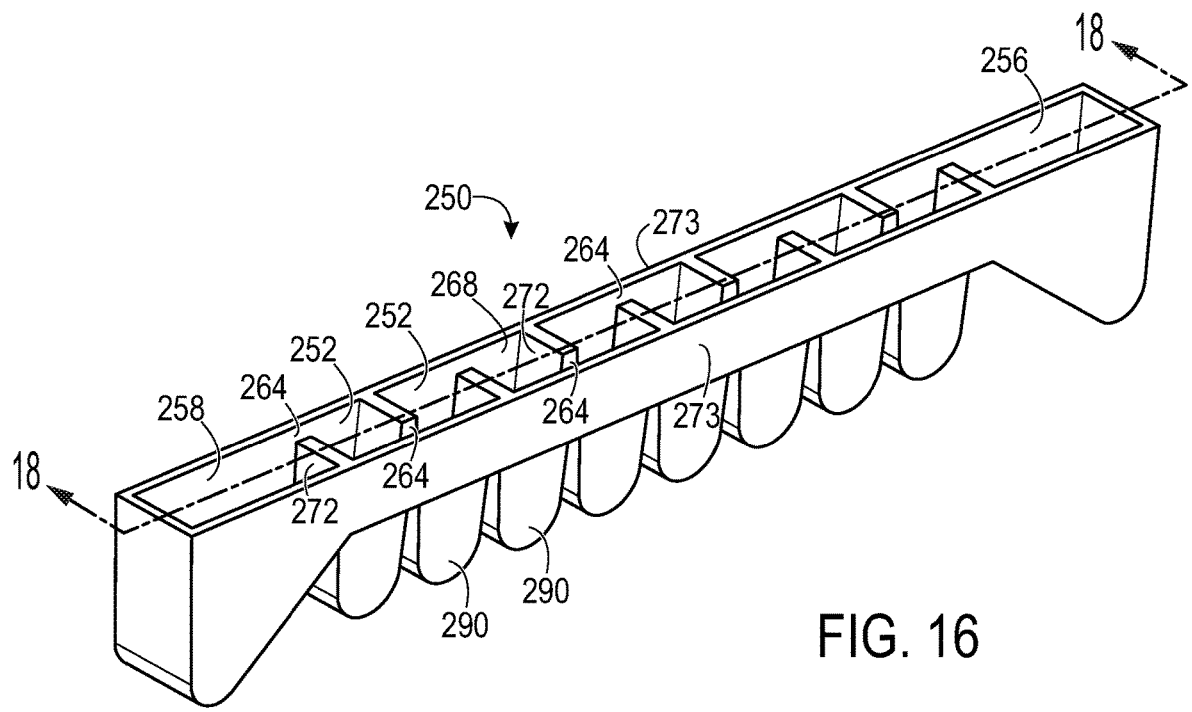
FIG. 16 is a view of an exemplary culture vessel defining a meandering flow path for liquid, such as media, through an upper region of a row of wells.
Figure 17:
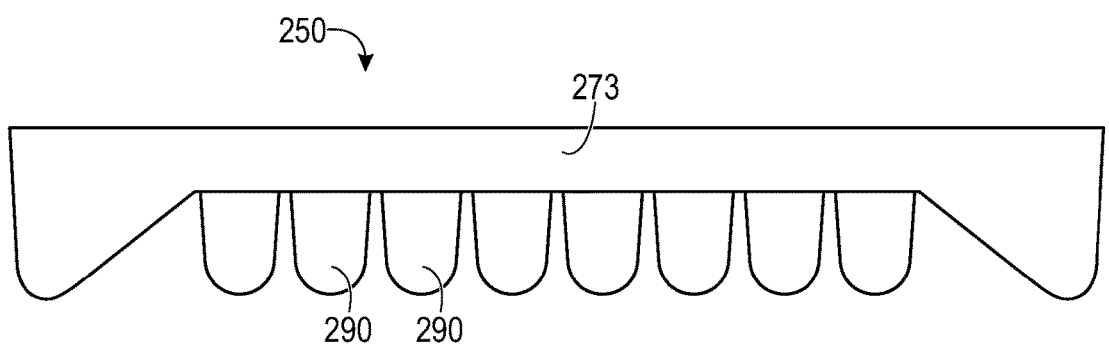
FIG. 17 is a side view of the culture vessel of FIG. 16.
Figure 18:
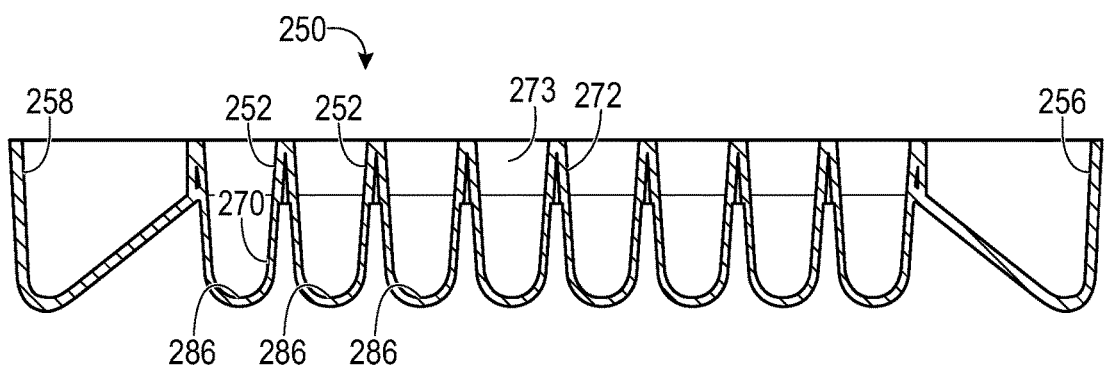
FIG. 18 is a sectional view of the culture vessel of FIG. 16, taken generally along line 18-18 of FIG. 16.
Figure 20:
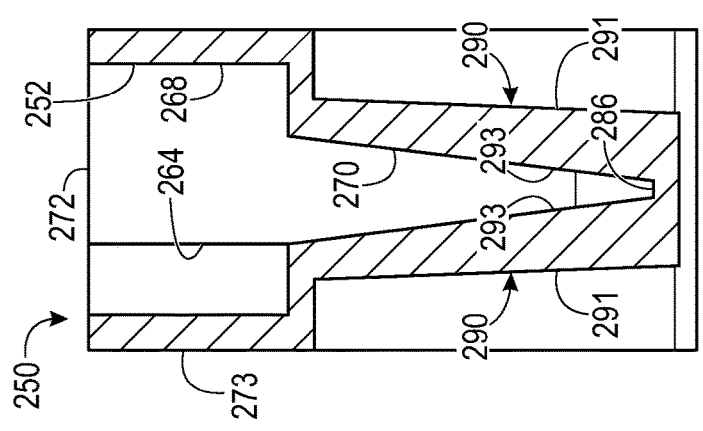
FIG. 20 is a sectional view of the culture vessel of FIG. 16, taken generally along line 20-20 of FIG. 19.

Each well 252 has a pair of lateral, transparent optical windows 290 opposite one in lower portion 270, to enable light sheet illumination (see FIGS. 16, 17, and 20). Each optical window 290 has an outer planar surface 291 and an inner planar surface 293, each parallel to the longitudinal axis of culture vessel 250, but oblique to one another (see FIG. 20). The pair of inner planar surfaces 293 may be oblique to one another, such that the inside width of lower portion 270 tapers downward (see FIG. 20). For example, an angle of about 10-20 degrees may be formed between inner planar surfaces 293. This taper in inside well width in a transverse vertical plane, along with the rounded inside shape in a longitudinal vertical plane, may encourage sedimentation of cells in medium to a narrow slot formed in the central area of inner bottom surface region 286 of each well. This geometry may facilitate formation of a three-dimensional cell cluster.

Outer planar surfaces 291 may be substantially vertical (e.g., less than about 2 degrees from vertical) to minimize refraction of illumination light at the air-polymer interface. The small offset from vertical may facilitate removal of the culture vessel from a mold during manufacture. The larger offset of inner planar surfaces 293 from vertical may be less significant, when performing light sheet microscopy, due to the smaller refractive index change at the polymer-media interface inside the well.

As long as the illuminating light sheet hits generally vertical surfaces, everything may be fine. However, if the light sheet approaches the very bottom of the inside of a well to scan a three-dimensional cell cluster (e.g., a 200 μm spheroid), the light sheet may hit edges due to the rounded shape of the well, which may produce stray light and adversely influence image quality. Hence, there may be a tradeoff for well geometry between a smaller radius yielding good conditions for spheroid formation and less movement during rocking, and a larger radius or even a flat bottom for light sheet microscopy.

Example 3. Culture Vessel with Flat-Bottom Wells

Figure 21:
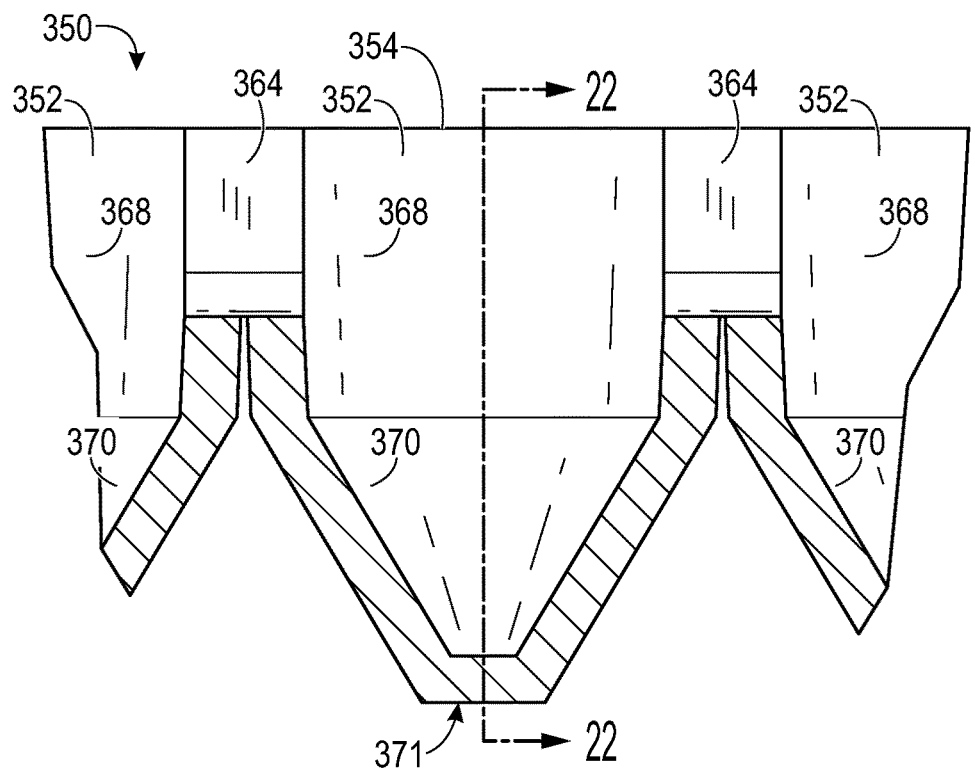
FIG. 21 is a fragmentary, longitudinal sectional view of a row of wells from another exemplary culture vessel defining a flow path for liquid, such as media, through an upper region of a row of wells, where the plane of section corresponds to that of FIG. 5.
Figure 22:
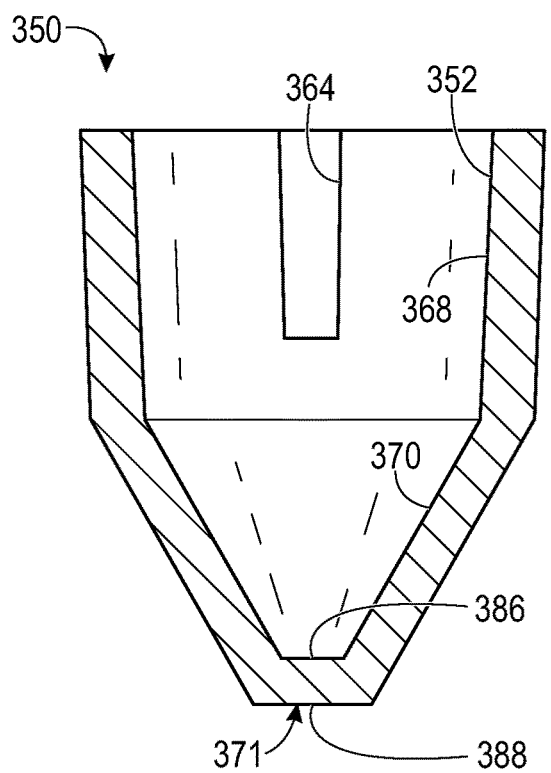
FIG. 22 is a transverse sectional view of one of the wells of the culture vessel of FIG. 21, taken generally along line 22-22 of FIG. 21.

This example describes an exemplary culture vessel 350 configured for controllable media exchange among wells 352, with each well having a bottom that is flat inside and outside the well; see FIGS. 21 and 22.

Culture vessel 350 may have any of the elements and features described above for other culture vessels. For example, each well 352 may have a structural communication with adjacent wells 352 of a row 354 thereof via passages 364. Passages 364 may permit controllable liquid flow between upper portions 368 of adjacent wells 352.

Cells may be contained in respective lower portions 370 of wells 352, which are below (at a lower elevation than) passages 364 when culture vessel 350 is horizontal. Each lower portion 370 may be conical as shown, with a flat bottom wall 371 (see FIGS. 21 and 22). More specifically, bottom wall 371 may include a horizontal, planar inner bottom surface region 386 and a horizontal, planar outer bottom surface region 388. The well may taper downward aggressively, to produce an area of inner surface region 386 that is much less than the horizontal inside area at the top of well 352, such as only 10%, 5%, or 3% of this top area, among others. For example, inside diameter at the top of the well may be about 6 mm, and the inside diameter may be less than about 1, 0.5, or 0.25 mm at the bottom of the well. This geometry may concentrate cells on inner bottom surface region 386 when the cells sediment, and thus may encourage formation of a 3D cell culture. In other cases, a 2D cell culture may be cultivated on inner bottom surface region 386. Flat bottom wall 371 permits conventional imaging configurations, such as epi-fluorescence microscopy, trans-illumination microscopy, and confocal microscopy, among others.

Example 4. Culture Vessel with a Plate Bonded to a Body

Figure 23:
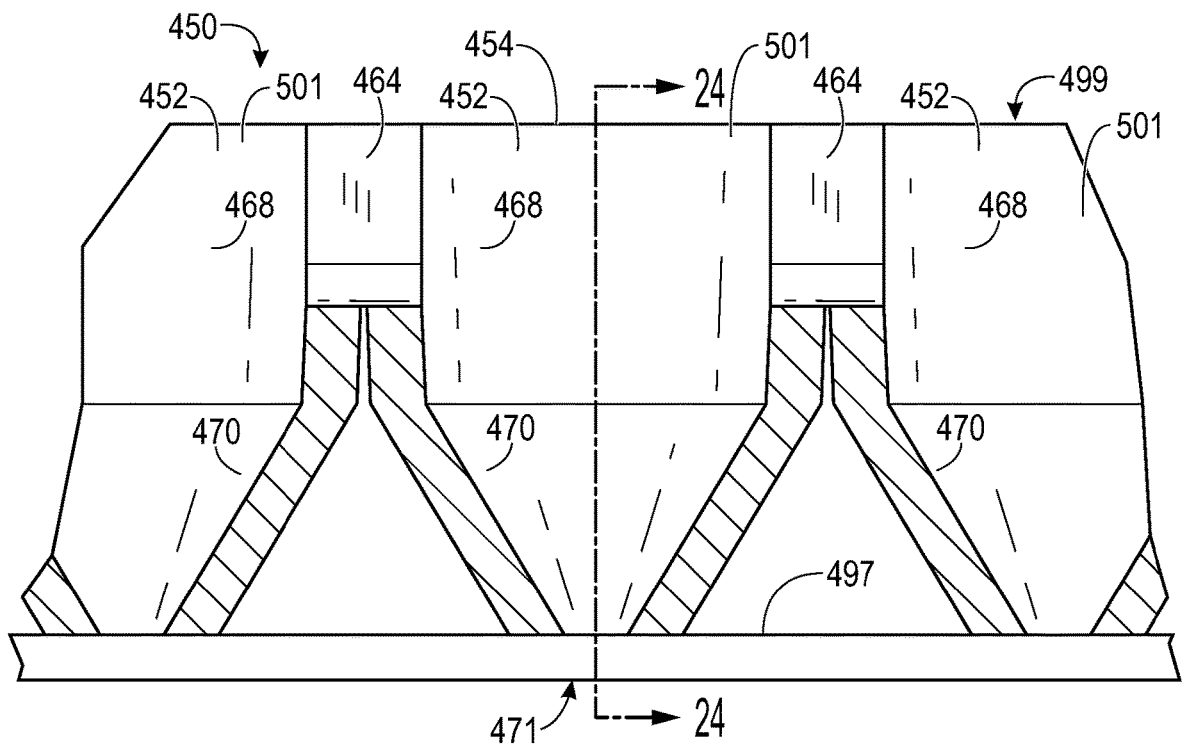
FIG. 23 is a longitudinal, fragmentary and partially sectional view of a row of wells from another exemplary culture vessel defining a flow path for liquid, such as media, through an upper region of a row of wells, where the plane of section corresponds to that of FIG. 21.
Figure 24:
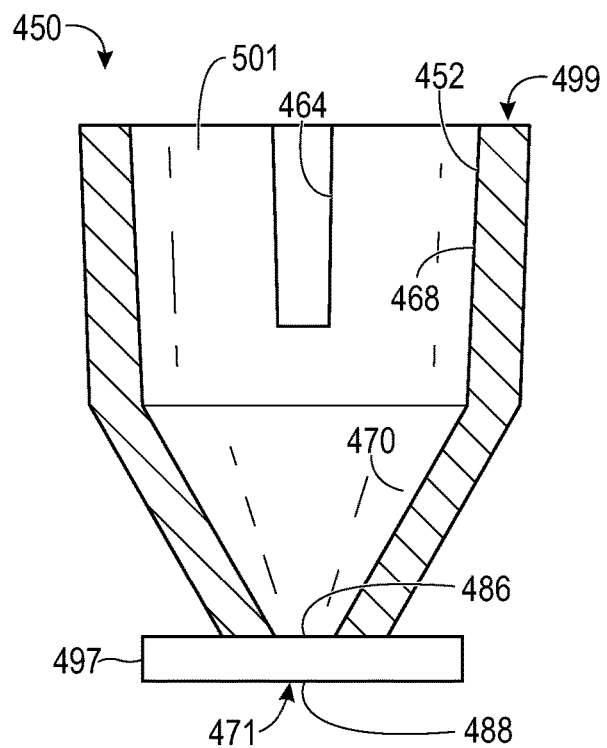
FIG. 24 is a transverse, partially sectional view of one of the wells of the culture vessel of FIG. 23, taken generally along line 24-24 of FIG. 23.

This example describes an exemplary culture vessel 450 configured for controllable media exchange among wells 452, with each well having a bottom 471 that is flat inside and outside the well and formed by a plate 497 that is bonded to an overlying body 499; see FIGS. 23 and 24.

Culture vessel 450 may have any of the elements and features described above for other culture vessels, such as culture vessel 350 (see Example 3). For example, each well 452 may have a structural communication with adjacent wells 452 of a row 454 thereof via passages 464. Passages 464 may permit controllable liquid flow between upper portions 468 of adjacent wells 452.

Cells may be contained in respective lower portions 470 of wells 452, which are below (at a lower elevation than) passages 464 when culture vessel 450 is horizontal. Each lower portion 470 may be conical as shown, with a flat bottom wall 471 (see FIGS. 23 and 24). More specifically, bottom wall 471 may include a horizontal, planar inner bottom surface region 486 and a horizontal, planar outer bottom surface region 488.

Plate 497 and body 499 may be formed separately from one another and then bonded to one another. Plate 497 may be flat, with planar upper and lower surfaces. The plate may be formed of any transparent, optical grade material, generally polymer or glass. Body 499, prior to attachment to plate 497, may define a plurality of compartments 501 that are precursors to wells 452. Each compartment 501 may be an opening defining a vertical through-axis. Compartment 501 may have an open top end and an open bottom end before plate 497 is bonded to body 499. The open bottom end of each compartment 501 may be closed by plate 497, which may form a fluid-tight seal with body 499 at the bottom end of the compartment to create wells 452.

An integrally-formed culture vessel may have wells with a varying bottom thickness, due to undesired dimensional variations of a corresponding mold used to form the vessel. This lack of a consistent bottom thickness may affect the ability to accurately focus on cells in the wells when imaging. One way to decrease variability of well bottom thickness utilizes the same plate 497 (glass or polymer) to form the bottom of each well. Plate 497 may be manufacturable with less variability in thickness than the bottom thickness of wells 452.

Example 5. Culture Vessel with Rounded-Bottom Wells

Figure 25:
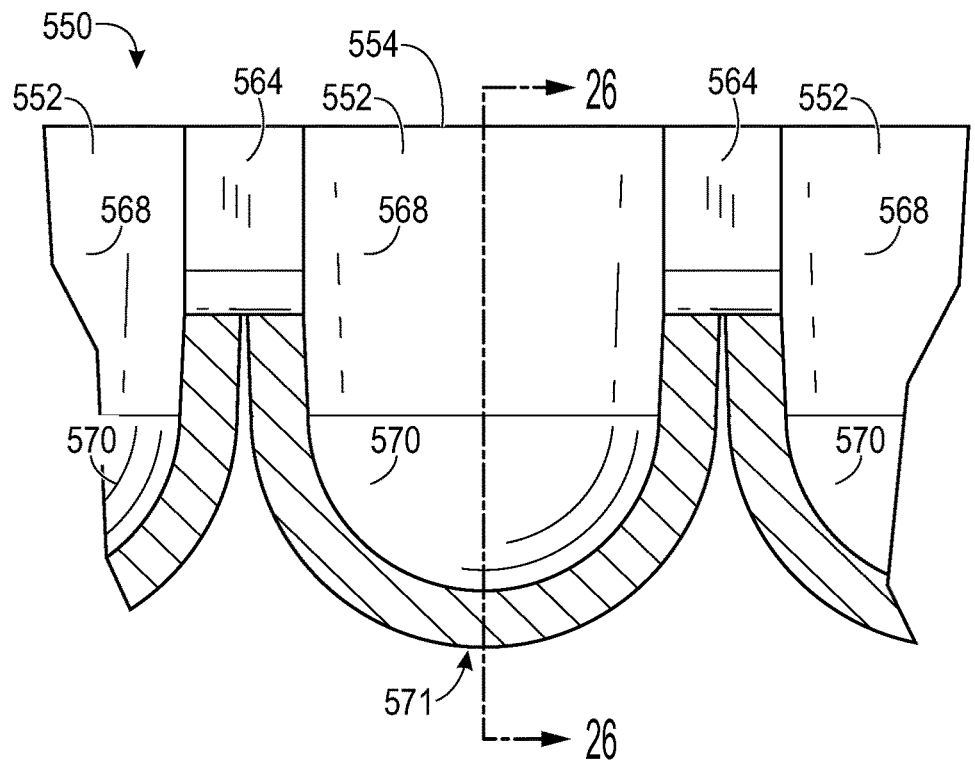
FIG. 25 is a fragmentary, longitudinal sectional view of a row of wells from another exemplary culture vessel defining a flow path for liquid, such as media, through an upper region of a row of wells, where the plane of section corresponds to that of FIG. 21.
Figure 26:
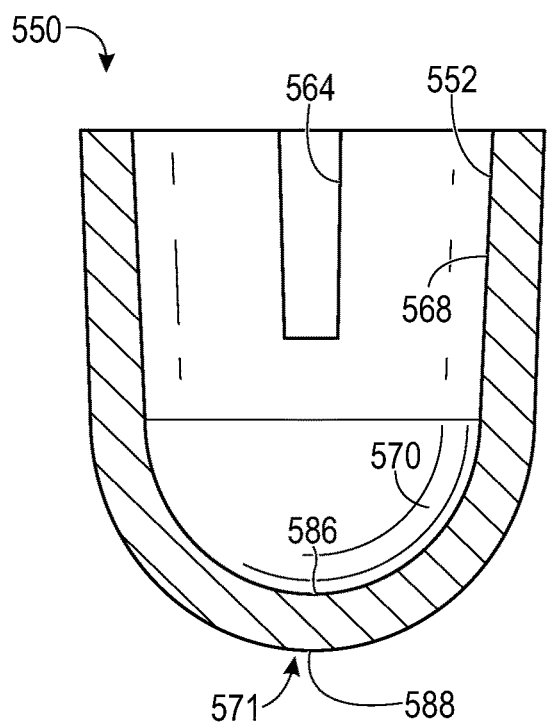
FIG. 26 is a transverse sectional view of one of the wells of the culture vessel of FIG. 25, taken generally along line 26-26 of FIG. 25.

This example describes an exemplary culture vessel 550 configured for controllable media exchange among wells 552, with each well having a bottom 571 that is rounded; see FIGS. 25 and 26.

Culture vessel 550 may have any of the elements and features described above for other culture vessels. For example, each well 552 may have a structural communication with adjacent wells 552 of a row 554 via passages 564. Passages 564 may permit controllable liquid flow between upper portions 568 of adjacent wells 552. Lower portions 568 of wells 552 may be rounded in a bottom region of the well in a pair of vertical planes that are orthogonal to one another. For example, bottom inner surface region 586 and bottom outer surface region 588 of each well 552 may be spherical in shaped (i.e., corresponding to a portion of a full sphere). In other cases, bottom inner surface region 586 may be rounded in orthogonal vertical planes and bottom outer surface region 588 may be planar and horizontal.

IV. SELECTED ASPECTS

This section describes selected aspects of the present disclosure as a series of indexed paragraphs.

A1. A method of cell cultivation, the method comprising: (a) selecting a device including a row of wells, and a first reservoir and a second reservoir located at opposite ends of the row of wells, wherein each well has a lower portion and an upper portion, and wherein the lower portion of each well of at least two of the wells contains a cell culture in contact with a medium; and (b) transferring liquid (such as media) between the first reservoir and the second reservoir at least partly along a flow path defined by the device and extending through the upper portion of each well of the row of wells, such that molecules of the media are exchanged between or among the at least two wells.

A2. The method of paragraph A1, wherein the flow path extends through a plurality of passages, and where each passage creates fluid communication between the upper portions of a pair of adjacent wells of the row of wells or between an upper portion of one of the reservoirs and the upper portion of an adjacent well of the row of wells.

A3. The method of paragraph A2, wherein at least one passage (or each passage) of the plurality of passages intersects a top lip of the upper portion of each well of an adjacent pair of wells.

A4. The method of paragraph A2 or A3, wherein a wall is shared between the upper portions of an adjacent pair of wells of the row of wells, and wherein a passage of the plurality of passages extends through the wall.

A5. The method of any of paragraphs A2 to A4, wherein at least one passage (or each passage) of the plurality of passages is formed in a top surface of the device.

A6. The method of any of paragraphs A2 to A5, wherein at least one passage (or each passage) of the plurality of passages is a slot.

A7. The method of paragraph A6, wherein the slot is elongated vertically.

A8. The method of any of paragraphs A1 to A7, wherein the flow path is nonlinear, and is optionally a meandering flow path.

A9. The method of any of paragraphs A1 to A8, wherein transferring liquid includes creating turbulence that encourages intra-well mixing of liquid in the lower and upper portions of each well of the row of wells.

A10. The method of any of paragraphs A1 to A9, wherein transferring liquid includes driving flow of liquid with gravity.

A11. The method of paragraph A10, wherein driving flow of liquid includes tilting the device to elevate the first reservoir relative to the second reservoir, such that liquid flows along the flow path to the row of wells from the first reservoir and from the row of wells to the second reservoir.

A12. The method of paragraph A11, wherein transferring liquid includes rocking the device such that gravity drives flow of the liquid alternately in opposite directions along the flow path between the first and second reservoirs.

A13. The method of any of paragraphs A1 to A10, where the flow path is a first flow path, wherein transferring liquid includes moving liquid from the first reservoir to the second reservoir along the first flow path, and wherein transferring liquid includes moving liquid from the second reservoir to the first reservoir along a second flow path located at least partially outside the device using a pump.

A14. The method of any of paragraphs A1 to A13, wherein transferring liquid includes moving one or more copies of at least one cellular product produced by the cell culture of one of the at least two wells to another of the at least two wells.

A15. The method of paragraph A14, wherein the at least one cellular product includes a secreted factor (e.g., a cytokine, chemokine, or growth factor), a lipid, DNA, RNA, a protein, a virus, and/or a bacterium.

A16. The method of any of paragraphs A1 to A15, wherein at least one of the at least two wells contains at least one three-dimensional cluster of cells.

A17. The method of paragraph A16, wherein the at least one three-dimensional cluster of cells includes an organoid.

A18. The method of any of paragraphs A1 to A17, wherein the at least two wells contain two, three, four, or more different types of organoids in respective wells.

A19. The method of paragraph A18, wherein the different types of organoids include organoids corresponding to any combination of brain, heart, intestine, kidney, stomach, and liver tissue.

A20. The method of any of paragraphs A16 to A19, wherein the at least one three-dimensional cluster of cells includes a spheroid.

A21. The method of paragraph A20, wherein the at least two wells contain two, three, or more different types of spheroids.

A22. The method of any of paragraphs A1 to A21, wherein at least one of the at least two wells contains a two-dimensional cell culture.

A23. The method of any of paragraphs A1 to A22, wherein the liquid contains a compound being tested for an effect on one or more of the cell cultures.

A24. The method of any of paragraphs A1 to A23, further comprising placing one or more progenitor cells for each cell culture into the at least two wells before selecting.

A25. The method of any of paragraphs A1 to A24, further comprising imaging at least a portion of the cell culture contained in one well of the at least two wells.

A26. The method of paragraph A25, wherein imaging includes imaging at least a portion of a three-dimensional cluster of cells.

A27. The method of paragraph 26, wherein the three-dimensional cluster of cells includes a spheroid or an organoid.

A28. The method of any of paragraphs A25 to A27, wherein imaging includes illuminating at least part of the one well from above or below the one well.

A29. The method of any of paragraphs A25 to A28, wherein imaging includes detecting light that has propagated through a top or a bottom of the one well.

A30. The method of any of paragraphs A25 to A29, wherein imaging includes fluorescence imaging, phase-contrast imaging, confocal imaging, and/or transmitted-light imaging.

A31. The method of any of paragraphs A25 to A30, wherein imaging includes illuminating at least part of the one well with light that has propagated through a lateral optical window of the one well.

A32. The method of any of paragraphs A25 to A31, wherein imaging includes detecting light that has propagated through a lateral optical window of the one well.

A33. The method of paragraph A31 or A32, wherein imaging is performed by light sheet microscopy.

A34. The method of any of paragraphs A1 to A33, wherein each reservoir has a ramp that extends from a bottom region of the reservoir to a passage located on the flow path at an end of the row of wells.

A35. The method of paragraph A34, wherein the ramp is inclined at an angle of less than 45 degrees from horizontal when the device has a horizontal orientation.

A36. The method of paragraph A34 or A35, wherein transferring liquid includes moving the ramp of at least one of the reservoirs to a substantially horizontal orientation.

A37. The method of any of paragraphs A1 to A36, wherein each reservoir is configured to hold more liquid than each well of the row of wells.

A38. The method of any of paragraphs A1 to A37, further comprising placing a lid on the device to cover the row of wells.

A39. The method of paragraph A38, wherein transferring liquid is performed while the lid is covering the row of wells and optionally both reservoirs.

A40. The method of any of paragraphs A1 to A39, wherein the device is according to any of paragraphs B1 to B41.

B1. A device for cell culture, the device comprising: (a) a row of wells each having a lower portion and an upper portion, the lower portion being configured to contain a cell culture; and (b) a first reservoir and a second reservoir located at opposite ends of the row of wells; wherein the device defines a flow path for liquid that extends from the first reservoir to the second reservoir via the row of wells and passes through the upper portion of each well of the row of wells.

B2. The device of paragraph B1, wherein the lower portion of each well is configured to receive liquid only via the upper portion of the well.

B3. The device of paragraph B1 or B2, wherein one or more wells (e.g., each well) of the row of wells has a flat bottom outside the well.

B4. The device of any of paragraphs B1 to B3, wherein one or more wells (e.g., each well) of the row of wells has a flat bottom inside the well.

B5. The device of any of paragraphs B1 to B4, wherein the lower portion of one or more wells (e.g., each well) of the row of wells is conical internally.

B6. The device of any of paragraphs B1 to B4, wherein the lower portion of at least one well (e.g., each well) of the row of wells includes a transparent, lateral optical window having an outer surface and an inner surface that are planar, and wherein each of the outer and inner surfaces is parallel to a longitudinal axis of the device.

B7. The device of paragraph B6, wherein the outer and inner surfaces are not parallel to one another.

B8. The device of paragraph B6 or B7, wherein the lower portion of the at least one well has a pair of transparent, lateral optical windows that are spaced from one another transverse to the row of wells.

B9. The device of any of paragraphs B1 to B8, wherein the row of wells defines a longitudinal axis, and wherein the lower portion of one or more wells (e.g., each well) of the row of wells is elongated parallel to the longitudinal axis in a horizontal plane.

B10. The device of any of paragraphs B1 to B9, wherein at least one well (e.g., each well) of the row of wells has a concave inner surface region at the bottom of the well.

B11. The device of paragraph B10, wherein the concave inner surface region is concave in a vertical plane that contains a longitudinal axis defined by the row of wells.

B12. The device of paragraph B10, wherein the concave inner surface region is concave in a vertical plane that is orthogonal to a longitudinal axis defined by the row of wells.

B13. The device of any of paragraphs B1 to B12, wherein the flow path follows a straight line through the row of wells.

B14. The device of any of paragraphs B1 to B12, wherein the flow path is a nonlinear flow path, such as a meandering flow path, through the row of wells.

B15. The device of any of paragraphs B1 to B14, wherein the flow path extends through a plurality of passages, and where each passage creates fluid communication between the upper portions of a pair of adjacent wells of the row of wells or between an upper portion of one of the reservoirs and the upper portion of an adjacent well of the row of wells.

B16. The device of paragraph B15, wherein at least one passage (or each passage) of the plurality of passages intersects a top lip of the upper portion of each well of an adjacent pair of wells.

B17. The device of paragraph B15 or B16, wherein a wall is shared between the upper regions of an adjacent pair of wells of the row of wells, and wherein a passage of the plurality of passages extends through the wall.

B18. The device of any of paragraphs B15 to B17, wherein at least one passage (or each passage) of the plurality of passages is formed in a top surface of the device.

B19. The device of any of paragraphs B15 to B17, wherein at least one passage (or each passage) of the plurality of passages is formed below and spaced from a top surface of the device B20. The device of any of paragraphs B15 to B19, wherein at least one passage (or each passage) of the plurality of passages is a slot.

B21. The device of paragraph B20, wherein the slot is elongated at least generally vertically.

B22. The device of any of paragraphs B1 to B21, wherein at least one reservoir of the first and second reservoirs has a different size and/or shape than each well of the row of wells.

B23. The device of paragraph B22, wherein the at least one reservoir has a larger capacity for holding liquid than each well of the row of wells.

B24. The device of paragraph B23, wherein the larger capacity is at least 2, 3, 4, or 5 times a liquid-holding capacity of each well of the row of wells.

B25. The device of any of paragraphs B1 to B24, wherein the device is a single piece (with no moving/removable parts).

B26. The device of paragraph B25, wherein the row of wells, the first reservoir, and the second reservoir are formed integrally with one another.

B27. The device of any of paragraphs B1 to B26, wherein the device is composed of polymer and is optionally injection-molded.

B28. The device of any of paragraphs B1 to B27, wherein a top surface of the row of wells is coplanar with a lip of each reservoir.

B29. The device of any of paragraphs B1 to B28, wherein the device is elongated parallel to the row of wells.

B30. The device of any of paragraphs B1 to B29, wherein the device has a single row of wells.

B31. The device of any of paragraphs B1 to B30, further comprising a lid configured to cover the row of wells and each reservoir.

B32. The device of any of paragraphs B1 to B31, wherein the device is packaged in a substantially sterile condition.

B33. The device of any of paragraphs B1 to B32, wherein one or more of the wells (such as each of the wells) has a bottom inner surface region that is rounded in a pair of vertical planes that are orthogonal to one another, and optionally is spherical.

B34. The device of any of paragraphs B1 to B33, wherein each well of the one or more wells (such as each well of the device) has a bottom outer surface region that is flat or that is rounded in a pair of vertical planes that are orthogonal to one another (and optionally spherical).

B35. The device of any of paragraphs B1 to B25 and B27 to B34, wherein the device includes a body and at least one plate bonded to a bottom of the body, and wherein the at least one plate forms a bottom region of one or more of the wells (such as each of the wells of the device).

B36. The device of paragraph B35, wherein the at least one plate forms a floor of each well of the one or more wells and forms a fluid tight seal with the body at the bottom region of the well.

B37. The device of paragraph B35 or B36, wherein, in the absence of the plate, the body includes a plurality of compartments, optionally each defining a vertical through-axis, and each having an open top and an open bottom, and wherein the at least one plate converts each compartment to a well having a closed bottom.

B38. The device of any of paragraphs B35 to B37, wherein the at least one plate forms a fluid-tight seal with the body at a bottom region of each well of the one or more wells.

B39. The device of any of paragraphs B35 to B38, wherein the body is composed of polymer, optionally injection molded.

B40. The device of any of paragraphs B35 to B39, wherein the body is formed from a pre-body having a plurality of wells, by cutting the pre-body to remove a bottom end of one or more wells of the pre-body.

B41. The device of any of paragraphs B35 to B40, wherein the body is a polymer body, and wherein the plate is a polymer plate or a glass plate.

C11. An apparatus, comprising: (a) a plurality of devices according to any of paragraphs B1 to B41; and (b) a frame to removably hold the plurality of devices in alignment with one another.

C2. The apparatus of paragraph C1, wherein the apparatus includes a rectangular array of wells formed by the rows of wells of the plurality of devices.

C3. The apparatus of paragraph C1 or C2, wherein a center-to-center spacing of wells within each row of wells is the same as a center-to-center spacing of wells between adjacent rows of wells.

C4. The apparatus of paragraph C3, wherein the center-to-center spacing of wells within each row of wells and the center-to-center spacing of wells between adjacent rows of wells are both 18, 9, or 4.5 mm.

C5. The apparatus of any of paragraphs C1 to C4, further comprising a lid configured to fit over at least one of the devices and cover the wells of the at least one device.

C6. The apparatus of paragraph C5, wherein the lid is configured to cover all of the wells and each of the reservoirs of the device.

C7. The apparatus of any of paragraphs C1 to C6, wherein the apparatus is packaged in a sterilized condition.

The term "exemplary" as used in the present disclosure, means "illustrative" or "serving as an example." Similarly, the term "exemplify" means "to illustrate by giving an example." Neither term implies desirability nor superiority.

While the invention has been described through the above examples and features, it will be understood by those of ordinary skill in the art that a wide variety of modifications, combinations and variations of the examples and features may be made without departing from the inventive concepts herein disclosed. Moreover, the invention should not be viewed as being limited to any specific purposes or embodiments described herein, but rather should be viewed as being applicable to accomplish a wide variety of purposes beyond those described herein. This disclosure described some examples of the present technology with reference to the accompanying drawings, in which only some of the possible examples were shown. Other aspects can, however, be embodied in many different forms and should not be construed as limited to the examples set forth herein even if not expressly exemplified in combination. Rather, these examples were provided so that this disclosure was thorough and complete and fully conveyed the scope of the possible examples to those skilled in the art.

We claim:

1. A method of cell cultivation, the method comprising:
(a) selecting a device including a row of wells, and a first reservoir and a second reservoir located at opposite ends of the row of wells,
wherein each well has:
a lower portion configured to contain a cell culture; and
an upper portion configured to define a flow path for liquid exchange between adjacent wells of the row of wells, wherein the upper portion is spatially separated from the lower portion to prevent migration of cells between the adjacent wells while enabling exchange of molecules between the adjacent wells, and wherein the lower portion of each well of at least two of the wells contains the cell culture in contact with a liquid; and
(b) transferring the liquid between the first reservoir and the second reservoir at least partly along a flow path defined by the device and extending through the upper portion of each well of the row of wells, such that the liquid is exchanged between or among the at least two wells.

2. The method of claim 1, wherein the flow path extends through a plurality of passages, each passage creating fluid communication between the upper portions of a pair of adjacent wells of the row of wells or between an upper portion of one of the reservoirs and the upper portion of an adjacent well of the row of wells.

3. The method of claim 1, wherein transferring the liquid includes creating turbulence that encourages intra-well mixing of liquid in the lower and upper portions of each well of the row of wells.

4. The method of claim 1, wherein transferring the liquid includes driving liquid flow with gravity.

5. The method of claim 4, wherein driving liquid flow includes tilting the device to elevate the first reservoir relative to the second reservoir, such that the liquid flows along the flow path to the row of wells from the first reservoir and from the row of wells to the second reservoir.

6. The method of claim 5, wherein transferring the liquid includes rocking the device such that gravity drives flow of the liquid alternately in opposite directions along the flow path between the first reservoir and the second reservoir.

7. The method of claim 1, further comprising introducing at least one three-dimensional cluster of cells into at least one of the at least two wells.

8. A device for cell culture, the device comprising:
(a) a row of wells, each well having:
a lower portion configured to contain a cell culture; and
an upper portion configured to define a flow path for liquid exchange between adjacent wells of the row of wells, wherein the upper portion is spatially separated from the lower portion to prevent migration of cells between the adjacent wells while enabling exchange of molecules between the adjacent wells; and
(b) a first reservoir and a second reservoir located at opposite ends of the row of wells;
wherein the device defines a flow path for liquid that extends from the first reservoir to the second reservoir via the row of wells and passes through the upper portion of each well of the row of wells.

9. The device of claim 8, wherein the lower portion of each well is configured to receive liquid only via the upper portion of the well.

10. The device of claim 8, wherein one or more of the wells of the row of wells has a flat bottom inside the one or more of the wells.

11. The device of claim 8, wherein the lower portion of at least one well of the row of wells includes a transparent, lateral optical window having an outer surface and an inner surface that are planar, and wherein each of the outer and inner surfaces is parallel to a longitudinal axis of the device.

12. The device of claim 8, wherein the flow path does not include a microfluidic channel.

13. The device of claim 8, wherein at least one well of the row of wells has a concave inner surface region at the bottom of the well that is concave in a vertical plane that contains a longitudinal axis defined by the row of wells.

14. The device of claim 8, wherein at least one well of the row of wells has a concave inner surface region at the bottom of the well that is concave in a vertical plane that is orthogonal to a longitudinal axis defined by the row of wells.

15. The device of claim 8, further comprising a lid configured to cover the row of wells, the first reservoir, and the second reservoir.

16. The device of claim 8, wherein each well of the one or more wells has a bottom outer surface region that is flat or that is rounded in a pair of vertical planes that are orthogonal to one another.

17. An apparatus comprising a frame to removably hold a plurality of the devices of claim 8 in alignment with one another, each of the plurality devices defining a single row of wells.

18. The apparatus of claim 17, wherein a center-to-center spacing of wells within each row of wells is the same as a center-to-center spacing of wells between adjacent rows of wells.

19. The apparatus of claim 17, further comprising a lid configured to fit over at least one of the devices and cover the wells of the at least one of the plurality of devices.

20. The apparatus of claim 19, wherein the lid is configured to cover all the wells and each of the reservoirs of the plurality of devices.

\* \* \* \* \*